United States Patent [19]

Fujiwara et al.

[11] Patent Number: 5,515,531
[45] Date of Patent: May 7, 1996

[54] PARALLEL DATABASE PROCESSING SYSTEM AND RETRIEVAL METHOD USING SECONDARY KEY

[75] Inventors: Shinji Fujiwara; Mitsuru Nagasaka, both of Kokubunji; Yooichi Shintani, Machida, all of Japan

[73] Assignee: Hitachi, Ltd., Tokyo, Japan

[21] Appl. No.: 69,193

[22] Filed: May 28, 1993

[30] Foreign Application Priority Data

May 29, 1992 [JP] Japan .................................... 4-139116

[51] Int. Cl.$^6$ .................................................. G06F 17/30
[52] U.S. Cl. ...................... 395/600; 364/DIG. 1; 364/282.1; 364/282.3; 364/282.4; 364/283.4
[58] Field of Search ................................................ 395/600

[56] References Cited

U.S. PATENT DOCUMENTS 5,307,484  4/1994  Baker et al. ............................. 395/600

Primary Examiner—Thomas G. Black
Assistant Examiner—Wayne Amsbury
Attorney, Agent, or Firm—Antonelli Terry Stout & Kraus

[57] ABSTRACT

A parallel database processing system a global database processing unit, a plurality of local database processing units, and a network interconnecting the global database processing unit and a plurality of local database processing units, wherein one table containing a number of records is partitioned into local tables, each local table being provided in a corresponding one of the local database processing units, secondary key indexes representing correspondence between the values of secondary keys for all records in the table and access information to the records corresponding to the secondary keys, are partitioned on the basis of the values into local secondary key indexes, each set of the local secondary key indexes being provided in a corresponding one of the local database processing units, and an identifying unit is provided in the global database processing unit, the identifying unit responsive to a retrieval request with the secondary key identifying the local database processing unit having the local secondary key index corresponding to the secondary key. At the global database processing unit, the retrieval request with the secondary key is received, the identifying unit identifies the local database processing unit having the local secondary key index corresponding to the secondary key, and the retrieval request with the secondary key is transferred to the identified local database processing unit. At the identified local database processing unit, its own local secondary key indexes are referred to obtain access information corresponding to the transferred retrieval request with the secondary key, and the retrieval request with the secondary key is processed by using the access information so that the local table corresponding to the retrieval request with the secondary key is accessed.

20 Claims, 19 Drawing Sheets

PARALLEL DATABASE PROCESSING SYSTEM AND RETRIEVAL METHOD USING SECONDARY KEY

BACKGROUND OF THE INVENTION

1. Field of the Invention

The present invention relates to a parallel database processing system having a plurality of horizontally partitioned partial tables, and more particularly to a parallel database processing system suitable for managing indexes of primary and secondary keys of tables, and further to a retrieval method using the secondary key.

2. Description of the Related Art

The technical development of parallel computer systems has allowed parallel database systems to gain practical use. Recently, the research and development of parallel data systems operating on shared-nothing parallel computers such as Bubba, Teradata DBC/1012, GAMMA, MDBS, and Tandem NonStop SQL are now progressing, for example, as described in "Principles of Distributed Database" by M. Tamer Ozsu and Partick Valduriez, published by Prentice-Hall International Inc, Sec. 15 at page 466.

In a conventional parallel database system, one table having a number of records is divided into fragments (hereinafter called local tables) each having a plurality of records, and the local tables are distributed to a plurality of processors enabling the parallel processing of the database. Such division of a table is called horizontal partition, and a key for identifying each local table is called a primary key.

A parallel database processing system is configured by a global database management system (hereinafter called GDBMS) for managing the entire table, and local database management systems (hereinafter called LDBMS) for managing local tables.

FIG. 7 illustrates a table management method used by a conventional parallel database processing system.

As described above, a table is partitioned into a plurality of local tables 26. Each local table 26 is stored in the LDBMS of each local database processing apparatus 13. Each LDBMS has primary key indexes 25, each indicating correspondence between the record position of each record in the local table 26 and each primary key. The primary key is a record identifier capable of definitely identifying each record. An employee number is illustratively used as the record identifier in this example. For the retrieval using a secondary key to be described later, each LDBMS also has local secondary key indexes 52, each indicating correspondence between the location of each record and each secondary key. All secondary keys are partitioned into plural sets of local secondary keys similar to the primary keys in the respective LDBMSs.

GDBMS of a global database processing apparatus 11 has a primary key partition (fragmental) table 21. This table 21 stores a primary key group and its corresponding LDBMS number. By referring to this table 21, it is possible to know in which LDBMS the record represented by the primary key is stored. To implement the primary key partition table 21, a B-tree, a hash table or function may be used.

In this system, the primary key or secondary key can be used to select a local table and identify a target index.

A table selection query with the primary key is processed while referring to the primary key partition table 21 stored in GDBMS and the main key indexes 25 stored in each LDBMS. In this case, the target LDBMS having data to be retrieved can be selected while referring to the primary key partition table 21 in GDBMS, and a table selection query is issued only to the target LDBMS.

How a table selection query with the secondary key is processed in this system will be described next with reference to FIG. 6. In the case of the selection query with the secondary key, it is uncertain which group of local secondary key indexes 52 contains the secondary key in concern. Therefore, GDBMS 50 of the global database processing apparatus issues a selection query to all LDBMSs 51 of the local database processing apparatuses (indicated at 501 in FIG. 6). Each LDBMS searches the concerned secondary key while referring to the local secondary key indexes 52 (indicated at 502 and 503). LDBMS 51 storing the concerned secondary key accesses its local table 26 (indicated at 504) to locate the target record (indicated at 505).

In the conventional parallel database system, a selection query using the secondary key is issued to all LDBMSs having a local table of the table from which data is retrieved. It is therefore necessary for GDBMS to broadcast a selection query to all LDBMSs via a communications network 12 interconnecting all processors of LDBMSs, and it is further necessary for all LDBMSs to return the responses to GDBMS. This broadcasting hinders greatly other message communications on the network. In addition, the need for processing the selection query at all LDBMSs is one contributing factor in lowering the throughput of a conventional parallel database system. These drawbacks become conspicuous as the number of LDBMSs increases.

Furthermore, a conventional parallel database processing system uses proprietary LDBMSs and interfaces between GDBMS and LDBMSs. There still is not known a parallel database system configured by standard LDBMSs, particularly a parallel database system configured by different types of LDBMSs interconnected by a network.

SUMMARY OF THE INVENTION

It is an object of the present invention to provide a parallel database processing system and a retrieval method using the secondary key which are unnecessary to activate all LDBMSs even if the secondary key is used.

It is another object of the present invention to provide a local database management system to be used in a parallel database processing system, the local database management system having a standard database processing language interface.

It is a further object of the present invention to configure a parallel database system under a distributed system environment with a plurality of computers having different databases and being interconnected by a network.

According to one aspect of the present invention, there is provided a method of retrieving a database by using a secondary key in a parallel database processing system having a global database processing unit, a plurality of local database processing units, and a network interconnecting the global database processing unit and a plurality of local database processing units. Therein, one table containing a number of records is partitioned into local tables, each local table being provided in a corresponding one of the local database processing units. Secondary key indexes representing correspondence between the values of secondary keys for all records in the table and access information to the records corresponding to the secondary keys are partitioned on the basis of the values of the secondary keys into local secondary key indexes, each set of the local secondary key indexes being provided in a corresponding one of the local database processing units, and an identifying unit is provided in the global database processing unit. The identifying unit responsive to a retrieval request with the secondary key identifying the local database processing unit has the local secondary key index corresponding to the secondary key, and the method includes the steps of: a) at the global database processing unit, receiving the retrieval request with the secondary key, causing the identifying unit to identify the local database processing unit having the local secondary key index corresponding to the secondary key, and transferring the retrieval request with the secondary key to the identified local database processing unit; and b) at the identified local database processing unit, referring to its own local secondary key indexes, obtaining the access information corresponding to the transferred retrieval request with the secondary key, and processing the retrieval request with the secondary key by using the access information so that the local table corresponding to the retrieval request with the secondary key is accessed.

According to an example of the present invention, the step b) includes the substeps of: at the identified local database processing unit, identifying the local database processing unit corresponding to the obtained access information; and at the local database processing unit corresponding to the obtained access information, accessing its own local table to obtain information of a target record.

According to another example of the present invention, the identifying unit is a table indicating correspondence between secondary key groups and corresponding ones of local database processing units having the local secondary key indexes corresponding the secondary key groups.

According to another aspect of the present invention, there is provided a parallel database processing system having a global database processing unit, a plurality of local database processing units, and a network interconnecting the global database processing unit and a plurality of local database processing units. Further one table containing a number of records is partitioned into local tables, each local table being provided in a corresponding one of the local database processing units, and secondary key indexes representing correspondence between the values of secondary keys for all records in the table and primary keys are partitioned on the basis of the values of the secondary keys into local secondary key indexes, each set of the local secondary key indexes being provided in a corresponding one of the local database processing units. The global database processing unit includes, an identifying unit responsive to a retrieval request with the secondary key for identifying the local database processing unit having the local secondary key index corresponding to the secondary key; and a unit for receiving the retrieval request with the secondary key, causing the identifying unit to identify the local database processing unit having the local secondary key index corresponding to the secondary key, and transferring the retrieval request with the secondary key to the identified local database processing unit. Each local database processing unit includes an access unit for referring to its own local secondary key indexes and converting the transferred retrieval request with the secondary key into a retrieval request with the primary key so that so that the local table corresponding to the retrieval request with the primary key is accessed.

According to a further aspect of the present invention, there is provided a distributed computer system having a plurality of computers interconnected by a network, wherein each said computer includes: a local database processing unit having a standard database processing language interface operating on each computer; a parallel execution control unit for controlling the parallel execution of the computers; and a global database processing unit for managing the database table generated by each computer. The global database processing unit of each computer manages fragmental database tables of the database table generated by each computer and distributed to a plurality of other computers of the distributed computer system. Each computer includes a unit for accessing in parallel the fragmental database tables distributed to a plurality of other computers by using the parallel execution control unit, and an interface between the parallel execution control unit and the local database processing unit in each computer relies on a standard database processing language.

According to an example of the present invention, the secondary key indexes indicating correspondence between the values of secondary keys of all records in the table and the access information to the records corresponding to the secondary keys are distributed to and stored in a plurality of local database processing apparatuses, and the identifying unit, i.e., a secondary key partition table, indicating correspondence between secondary key groups and the local database apparatuses, each having secondary key indexes corresponding to the secondary key group, is provided in the global database processing apparatus. Accordingly, in the parallel database processing system, a retrieval request with the secondary key is transmitted only to a particular local database processing apparatus identified by the secondary key partition table, without transmitting the retrieval request to all of the local database processing apparatuses as in the conventional case. The access information to a record corresponding to the secondary key may be the storage location information of a record, identification information of the local database processing apparatus having the local table storing a target record, the primary key of a record, or the like.

Secondary key indexes of all records may be provided in the global database processsing apparatus. Also in this case, it is not necessary to transmit the retrieval request with the secondary key to all of the local database processing apparatuses.

By using secondary key indexes indicating correspondence between secondary keys and primary keys, the retrieval request with the secondary key can be easily converted into the retrieval request with the primary key. It therefore becomes easy to change the storage location of a record in each local database processing apparatus, thus improving the independence between local database processing apparatuses. It also becomes possible to use an interface of a standard database language level.

The secondary key indexes indicating correspondence between secondary keys and primary keys may be distributed to and stored in a plurality of local database processing apparatuses and a copy of the primary key partition table is stored in each local database processing apparatus. In this case, the converted retrieval request can be directly transferred to the target local database processing apparatus without the help of the global database processing apparatus, thus reducing the burden on the global database processing apparatus and eliminating the bottleneck of the global database processing apparatus when increasing the number of local database processing apparatuses.

Provision of a parallel execution control unit between the global database processing apparatus and each local database processing apparatus improves the independence between local database processing apparatuses, thus allowing a database system with a standard database processing language interface to be used with the parallel database system of this invention.

It is also possible to configure a distributed parallel database system by using an already configured database system having a plurality of different computers interconnected by a network and having a standard interface. With such a distributed database system, only tables to be parallel processed are horizontally distributed to and stored in a plurality of computers, allowing the parallel processing of the database tables.

DESCRIPTION OF THE PREFERRED EMBODIMENTS

Figure 1:
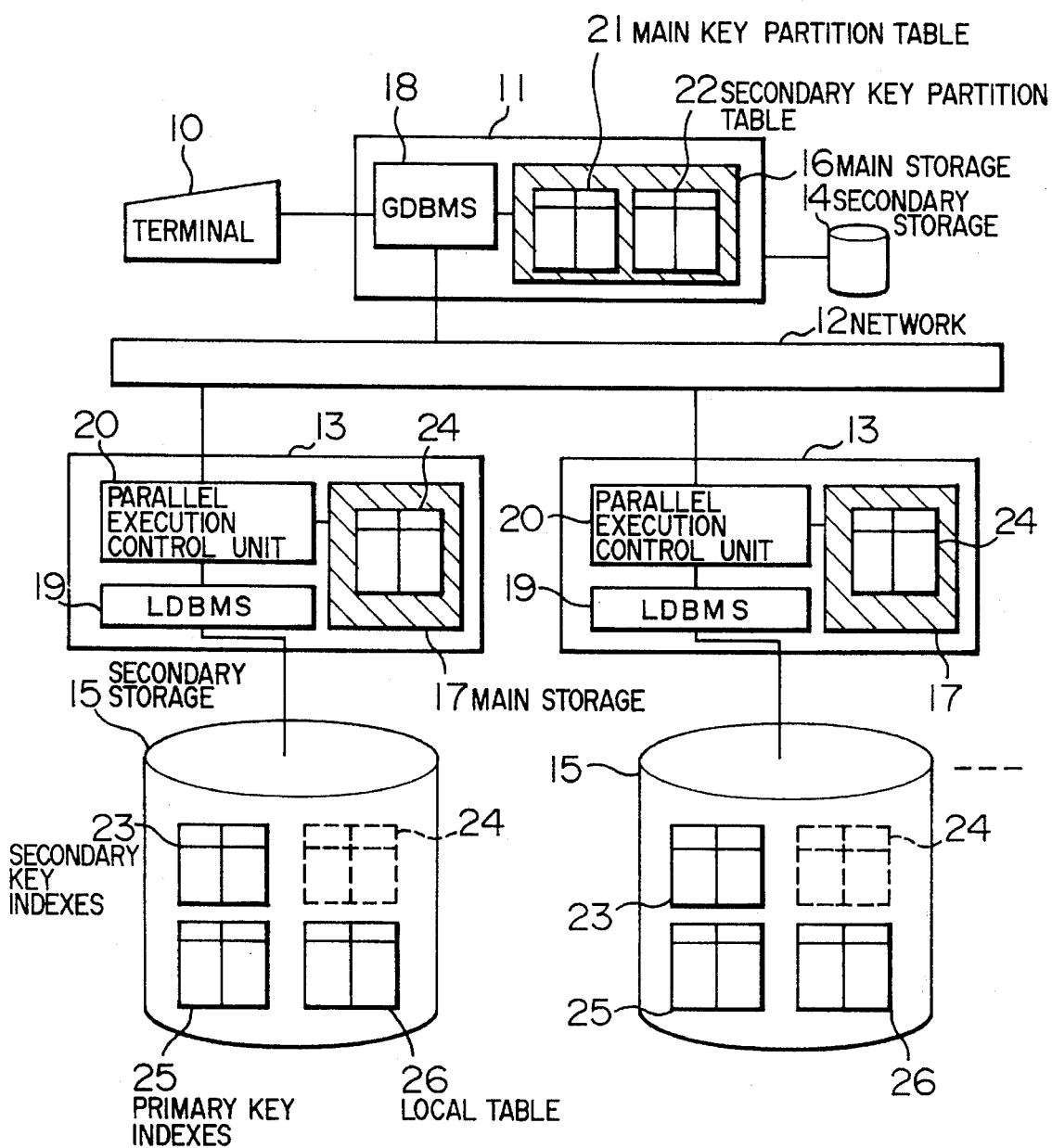
FIG. 1 is a block diagram showing the structure of a parallel database processing system according to a first embodiment of the present invention.

FIG. 1 shows the configuration of a parallel database processing system according to the first embodiment of the present invention.

In FIG. 1, reference numeral 10 represents a terminal from which a selection query is output to a database, reference numeral 11 represents a global database processing apparatus which provides a global database management, reference numeral 13 represents a plurality of local database processing apparatuses each storing a local table, and reference numeral 12 represents a network interconnecting the processing apparatuses. The network 12 may be any one of networks interconnecting processors such as a LAN and hypercube.

The global database processing apparatus 11 has a global database management system (GDBMS) 18 which has a primary key partition table 21 and a secondary key partition table 22 to be copied to a main storage 16. GDBMS 18 also has a secondary storage 14 for storing table management information or the like including the tables 21 and 22. The primary key partition table and secondary key partition table are implemented by using B-tree indexes, hash function or the like. The local database processing apparatus 13 has a parallel execution control unit (selection query processing unit) 20, a local database management system (LDBMS) 19, a secondary storage 15, and a copy 24 of the primary key partition table 21 of GDBMS 18. The parallel execution control unit 20 controls the communications between database processing apparatuses and the database parallel processing. LDBMS 19 controls an access to a local table 26 and to indexes. The secondary storage 15 stores secondary key indexes 23, primary key indexes 25, and the local table 26. FIG. 1 shows the state that the copy 24 stored in the secondary storage 15 is read in a main storage 17. If the capacity of the main storage 17 permits, the primary key indexes 25 and secondary key indexes may be stored and remain resident in the main storage 17.

In this embodiment, the secondary key partition table 22, secondary key indexes 23, and the copy 24 of the main key partition table are newly provided. This provision allows for processing of a table selection query with the secondary key by using only the target LDBMS, which will be detailed in the following.

Figure 2:
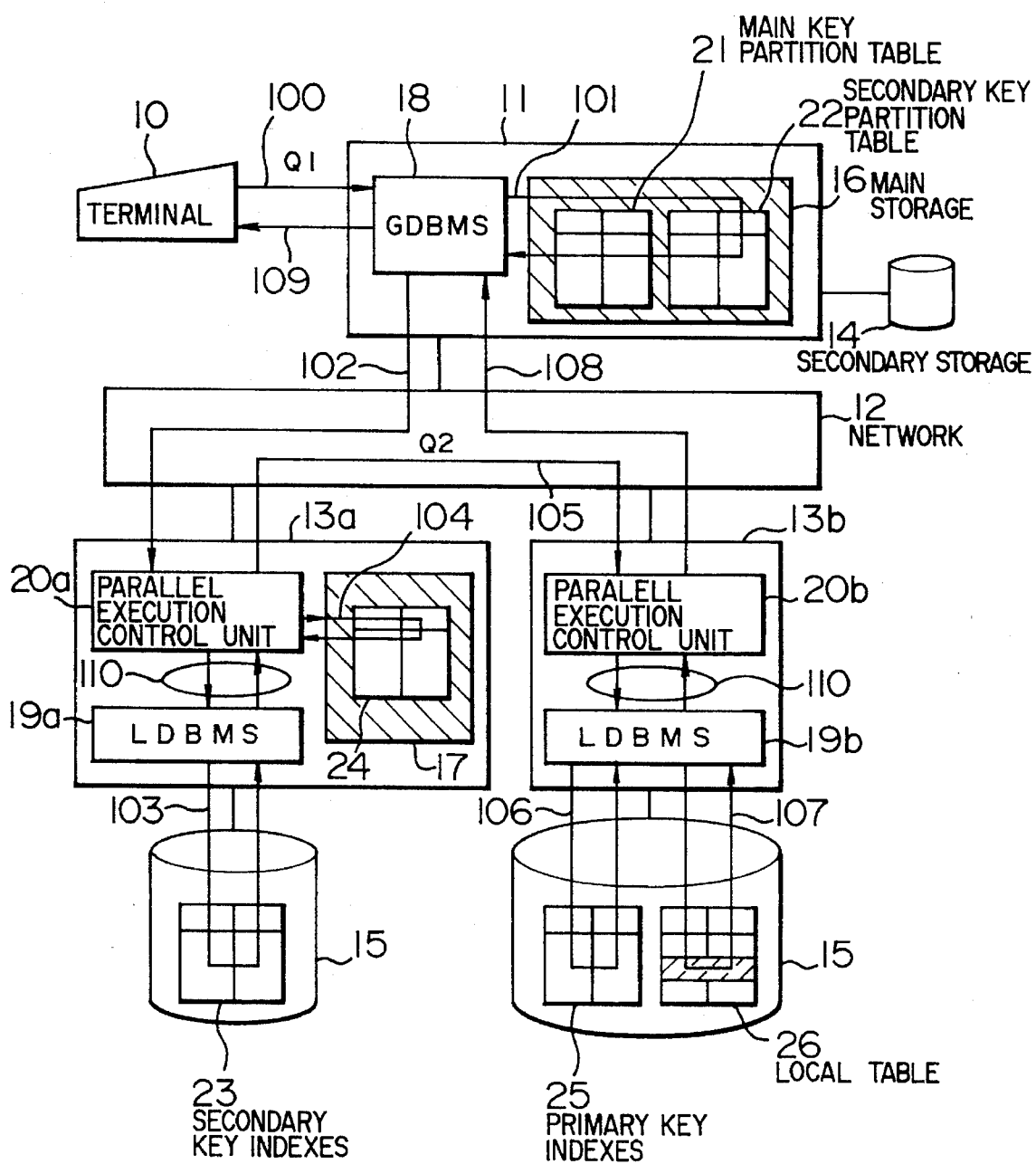
FIG. 2 is a schematic diagram explaining the operation of processing a table selection query with a secondary key of the first embodiment.

Referring to FIG. 2, a table selection query Q1 with the secondary key entered from the terminal 10 is transmitted to GDBMS 18 (indicated at 100 in FIG. 2). Upon reception of Q1, GDBMS 18 refers to the secondary key partition table 22 to select LDBMS storing the index corresponding to the involved key (indicated at 101). Q1 is then transmitted via the network 12 to the selected local database processing apparatus, for example, apparatus 13a (indicated at 102). The parallel execution control unit 20a of the apparatus 13a analyzes the received Q1, and determines the primary key of the involved secondary key while referring to the secondary key indexes 23 of LDBMS 19a (indicated at 103). Q1 is then converted into a table selection query using the primary key. Next, while referring to the copy 24 of the primary key partition table in the local database processing apparatus 13a, access information to the LDBMS storing the record corresponding to the obtained primary key is identified (indicated at 104). The converted Q2 is transmitted to the newly selected LDBMS (indicated at 105). Upon reception of Q2 by the local database processing apparatus, for example, apparatus 13b, the parallel execution control unit 29b analyzes Q2, and after referring to the primary key indexes 25 in LDBMS 19b (indicated at 106), the retrieval process for the local table (fragmental database) is executed (indicated at 107). The execution result is passed from the parallel control execution unit 20b to GDBMS 18 (indicated at 108), and transferred to the requested terminal 10 (indicated at 109).

Figure 3:
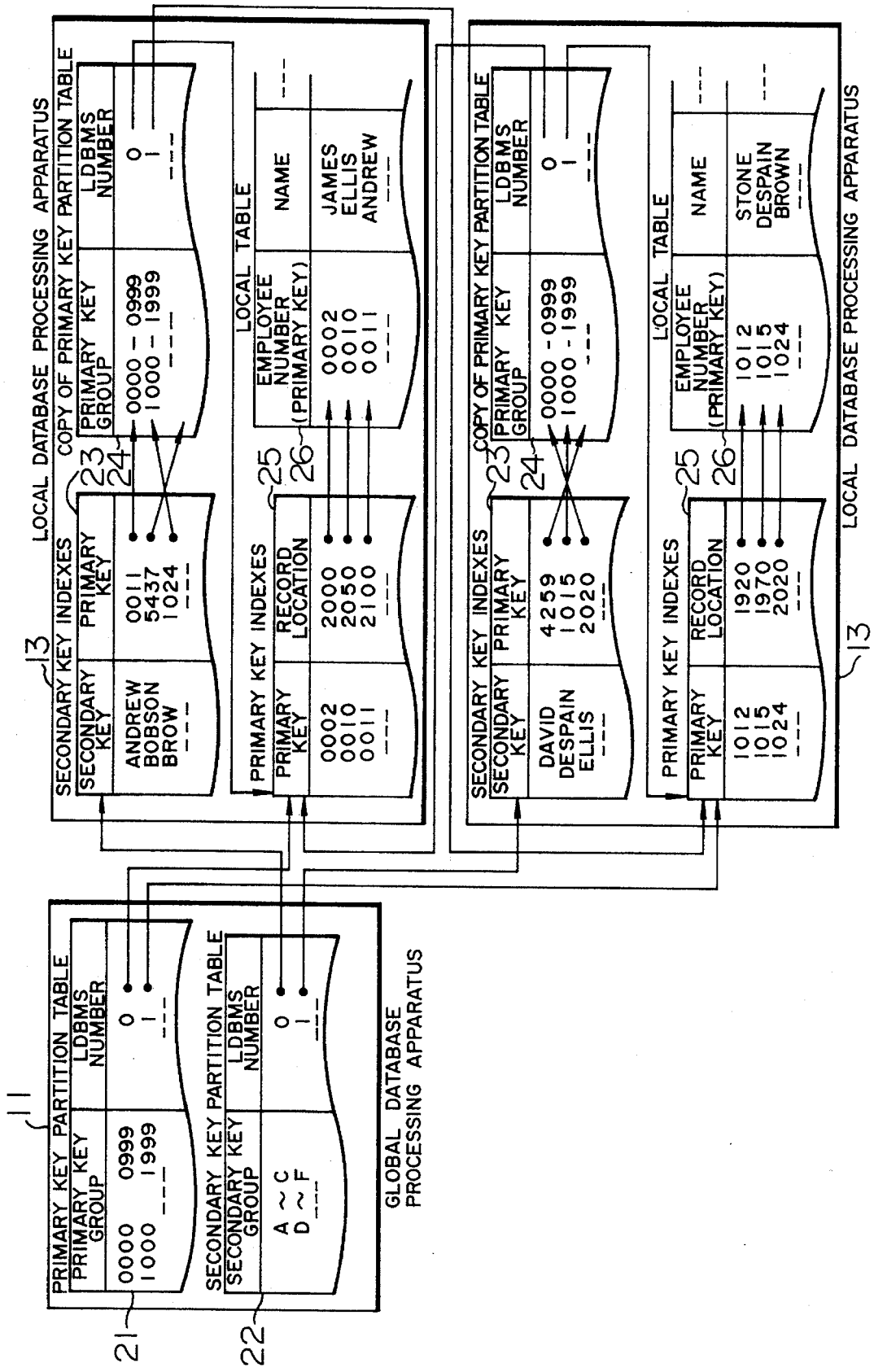
FIG. 3 shows the details of tables and indexes of the first embodiment.

FIG. 3 shows the details of the management information of tables and indexes used in this embodiment. The global database processing apparatus 11 manages the primary key partition table 21 and secondary key partition table 22. The primary key partition table 21 is constituted by primary key groups and their corresponding LDBMS numbers, each identifying the local table storing some records. The secondary key partition table 22 is constituted by secondary key groups (A to C, D to F, . . . in the example shown in FIG. 3) and their corresponding LDBMS numbers, each identifying the local table storing some records. In this embodiment, the key partition table is formed on the group partition basis. In the case of a hash partition using a hash function, primary and secondary key hash functions are used in place of the primary and secondary key partition tables, realizing the processing apparatus having the same function as this embodiment. The local database processing apparatus 13 manages the primary key indexes 25, secondary key indexes 23, and the copy 24 of the primary key partition table 21 of the global database processing apparatus. The primary key indexes 25 each indicate the storage location of a record corresponding to each primary key, and the secondary key indexes 23 each indicate the primary key corresponding to the value of each secondary key. A group of the secondary key indexes 23 held in each of LDBMSs is a fragment of correspondence relations between the secondary keys and the primary keys of the records of all of the local tables which are fragmented based on the secondary key partition table 22. For example, the secondary key indexes 23 corresponding to the LDBMS number 0 are ones in a range of A to C of secondary keys. A group of the primary key indexes 25 held in each of LDBMSs is a fragment of correspondence relations between the primary keys and the storage positions which are fragmented based on the numbers of LDBMSs. The primary keys associated with the primary key indexes 25 of each local database processing apparatus have one-to-one correspondence with the records stored in its local table. However, such correspondence is not given to the secondary keys associated with the secondary key indexes 23. The reason for this is that each group of the secondary key indexes 23 is a fragment, i.e., secondary key local indexes, of a plurality of groups obtained by partitioning all secondary keys of all the local tables (constituting one table of a database) in the alphabetical order (A, B, C, D, . . . ) of secondary keys (employee names) while giving a correspondence of each secondary key to the primary key.

In this embodiment, only the primary key indexes 25 are assigned the physical locations of records, and the secondary key indexes 23 are not assigned the physical locations of records. Accordingly, the physical locations of records stored in the local tables can be changed by changing the primary key indexes so that the dynamic relocation of records of a parallel database system can be made at high speed. In addition to this merit, the interface between local database processing apparatuses can be realized on the database processing language level, by converting the access request or selection query with the secondary key into that with the primary key.

Figure 4:
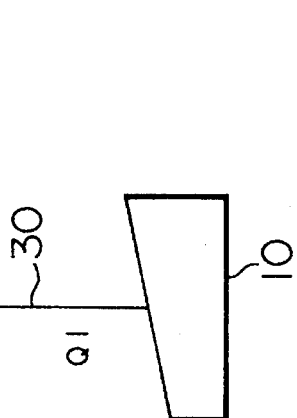
FIG. 4 shows an example of processing a table selection query with a primary key of the first embodiment.

An example of processing a table selection query with the primary key in this embodiment will be described with reference to FIG. 4. A table selection query Q1 entered from the terminal 10 is given by the following statement (1):

SELECT * FROM Employee Table WHERE Employee Number= 1024      (1)

This query requests retrieval of record information from "Employee Table" by using the employee number "1024" as the main key. The query Q1 is transferred from the terminal 10 to the global database, processing apparatus 11 (indicated at 30 in FIG. 4), and after referring to the primary key partition table 21, the query Q1 is transferred to the local database processing apparatus, for example, apparatus 13b having the target record (indicated at 31). In this case, since Q1 is the query with the primary key, the local database processing apparatus 13b requests LDBMS to process the Q1 query. LDBMS then refers to the primary key indexes 25 of LDBMS to identify the location 2020 of the target record (indicated at 32). The record in the local table 26 at this location is accessed to obtain the target record (indicated at 33).

Figure 5:
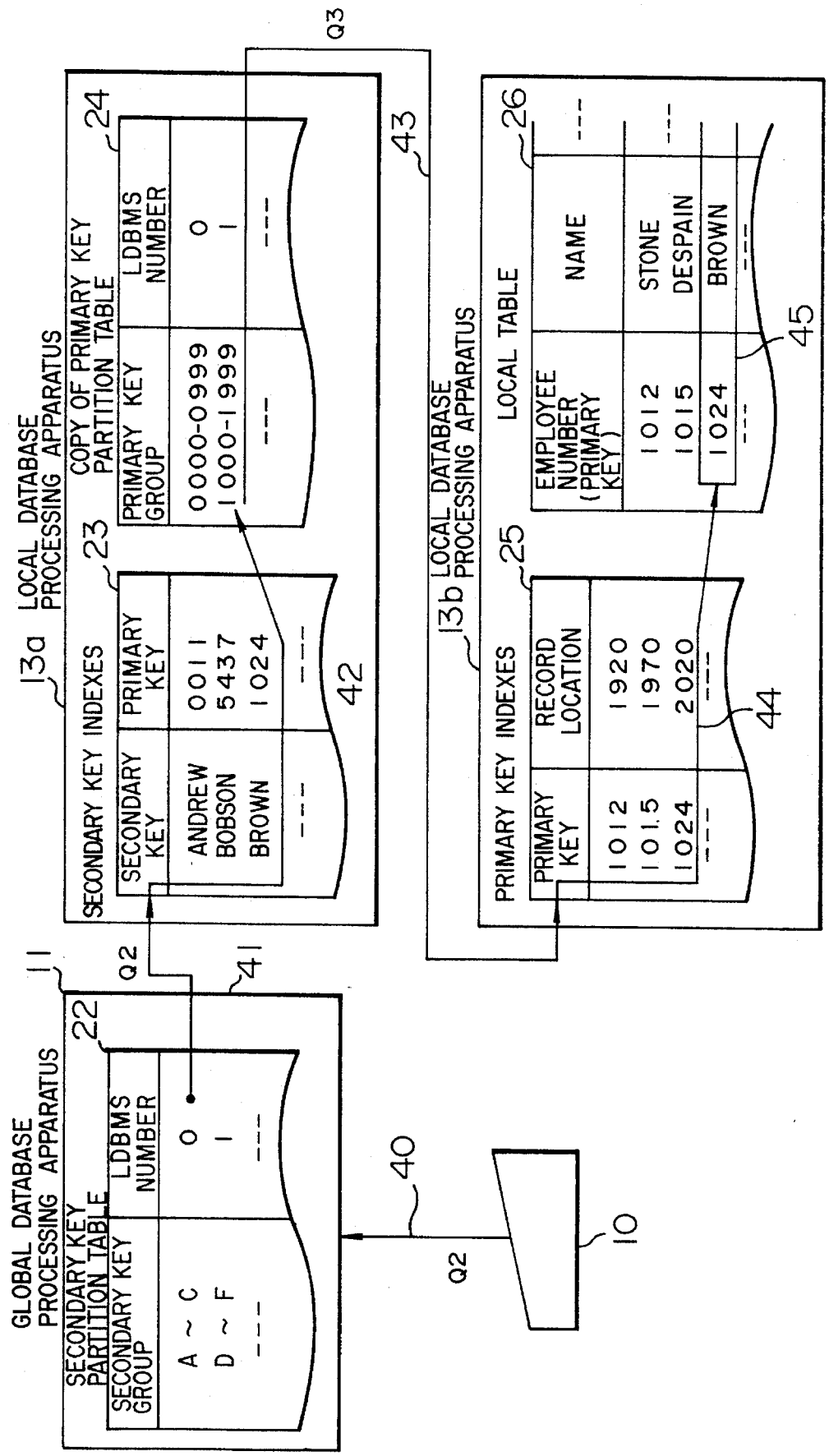
FIG. 5 shows an example of processing a table selection query with a secondary key of the first embodiment.
Figure 6:
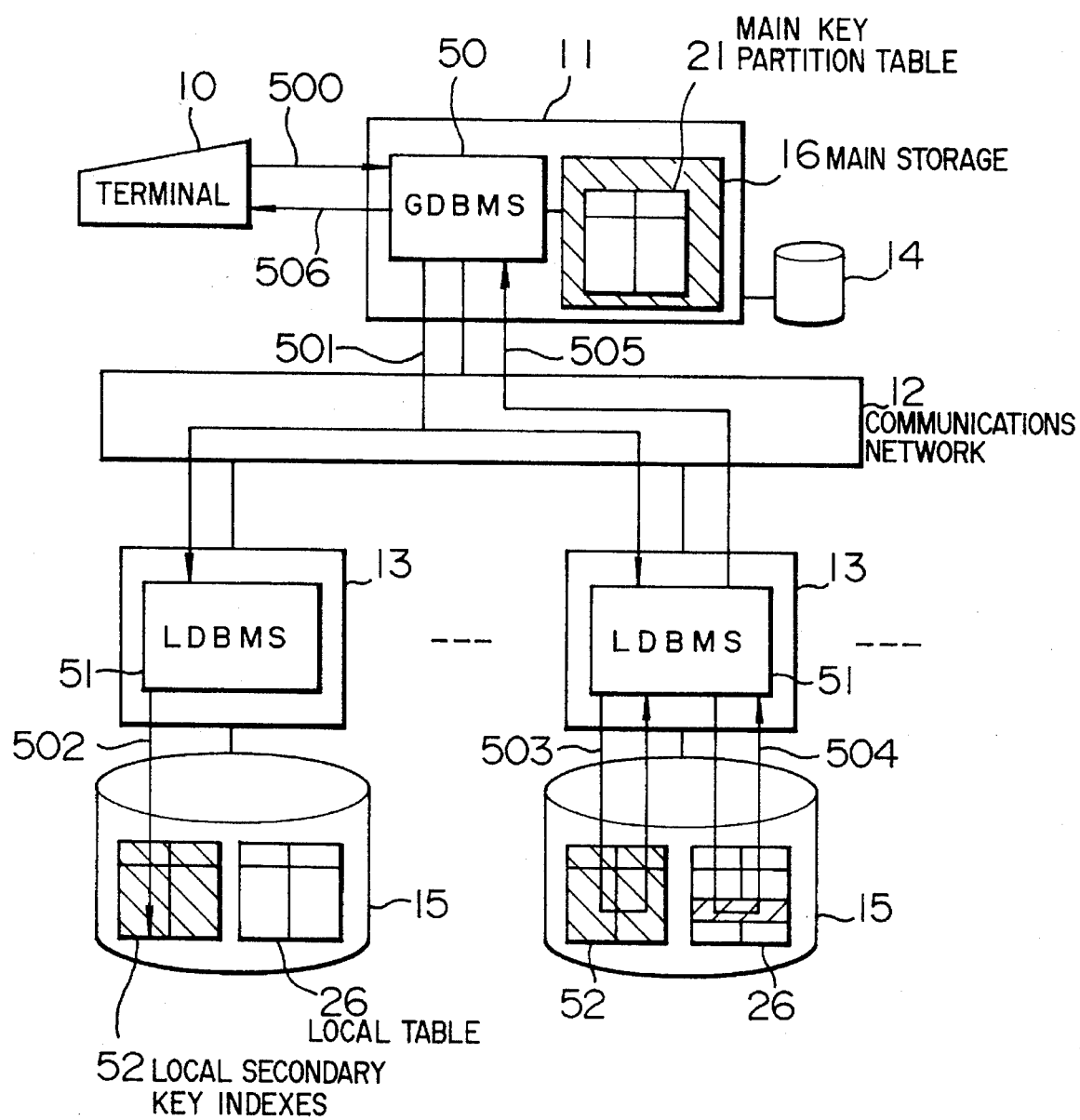
FIG. 6 is a schematic diagram of a conventional parallel database processing system and explaining an example of processing a table selection query with a secondary key.

Next, an example of processing a table selection query with the secondary key in this embodiment will be described with reference to FIG. 5. A table selection query Q2 entered from the terminal 10 is given by the following statement (2). In this example, an employee name is used as the secondary key.

SELECT * FROM Employee Table WHERE Employee Name= "Brown"      (2)

This query requests to retrieve record information from "Employee Table" by using the employee name "Brown" as the secondary key. The query Q2 is transferred from the terminal 10 to the global database processing apparatus 11 (indicated at 40 in FIG. 5), and after referring to the secondary key partition table 22, the query Q2 is transferred to the local database processing apparatus, for example, apparatus 13a having the corresponding secondary key indexes (indicated at 41). Upon reception of Q2, the local database processing apparatus 13a searches the secondary key indexes 23 to obtain the primary key "1024" corresponding to the value (name "Brown") of the secondary key indicated by Q2 (indicated at 42). The query Q2 is then converted into a table selection query Q3 with the primary key (indicated at 42). This query Q3 is given by the following statement (3):

SELECT * FROM Employee Table WHERE Employee Number= 1024      (3)

The query Q3 given by the statement (3) has the same contents as the query Q1 given by the statement (1). After referring to the copy 24 of the primary key partition table stored in the local database processing apparatus 13a, the table selection query Q3 is transferred to the local database processing apparatus, for example, apparatus 13b having the target record (indicated at 43). Upon reception of the query 13b, the local database processing apparatus 13b refers to the main key indexes 25 to identify the location "2020" of the target record (indicated at 44) and obtain the target record (indicated at 45).

One of the features of this embodiment is that the communications between the global and local database processing apparatuses are realized on the database processing language level without using the record physical location. Another feature of this embodiment is that the selection query with the second key can be processed by accessing only the local database processing apparatus having the secondary key indexes of the target record and by accessing the same or different local database processing apparatus having the target record. Another feature of this embodiment is that groups of secondary key indexes for converting the values of secondary keys into primary keys are distributed to and stored in the respective local database processing apparatuses to convert the selection query with the secondary key into the selection query with the primary key, so that the conventional local secondary key indexes indicating the physical record locations of secondary keys are not necessary.

Figure 8:
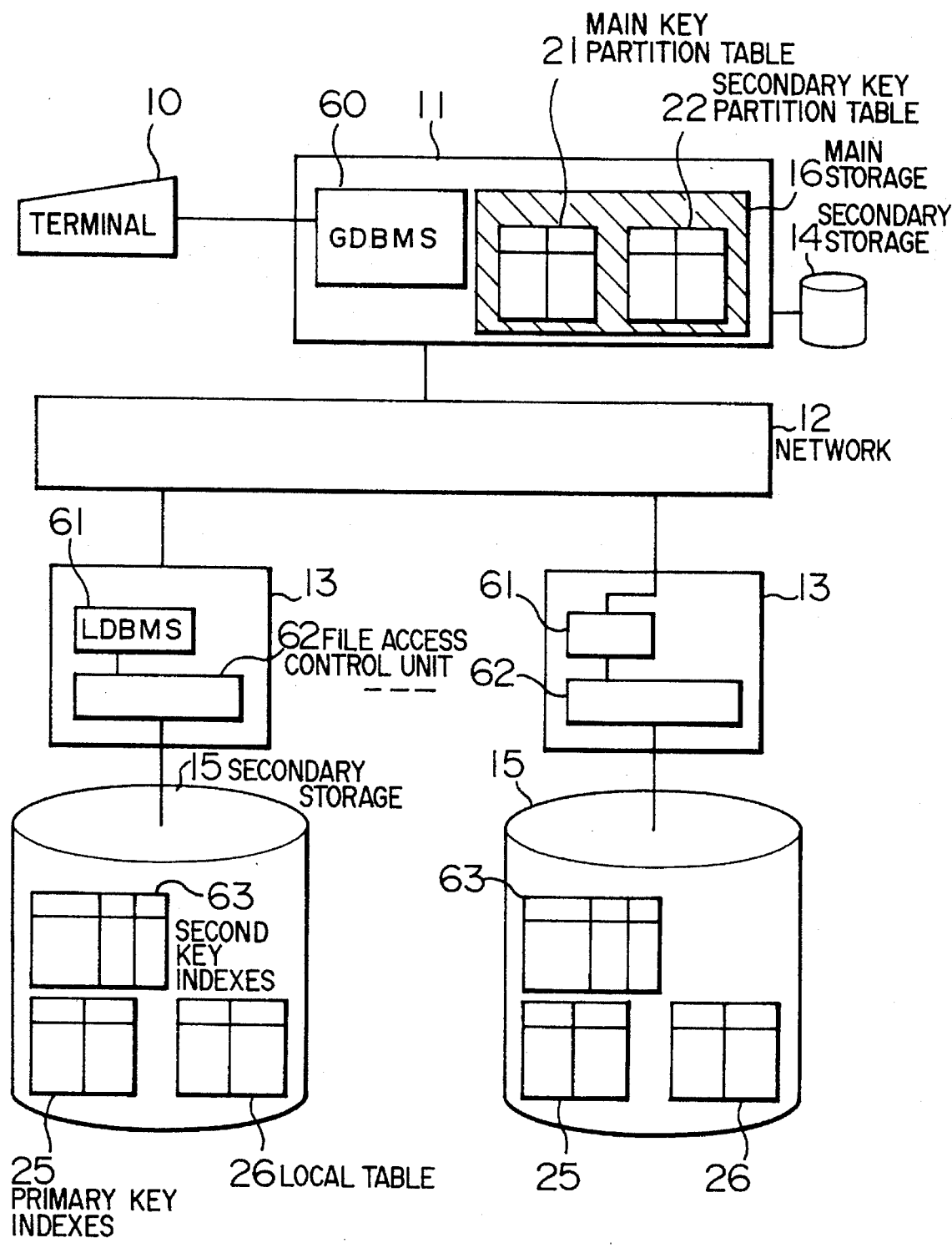
FIG. 8 is a block diagram showing the structure of a parallel database processing system according to a second embodiment of the present invention.

FIG. 8 shows the entire structure of a parallel database processing system according to the second embodiment of the present invention. In this embodiment, the secondary key partition table 22 is newly provided, and the secondary key indexes include the record physical locations of the secondary keys. Each local database processing apparatus 13 has LDBMS 61 and a file access control unit 62 which controls the data transfer between LDBMSs 13. In place of the secondary key indexes 23 of the first embodiment, the secondary key indexes 63 are used so that the copy 24 of the primary key partition table becomes unnecessary. This embodiment is effective for configuring a parallel data system on a computer already having a remote file access function.

Figure 9:
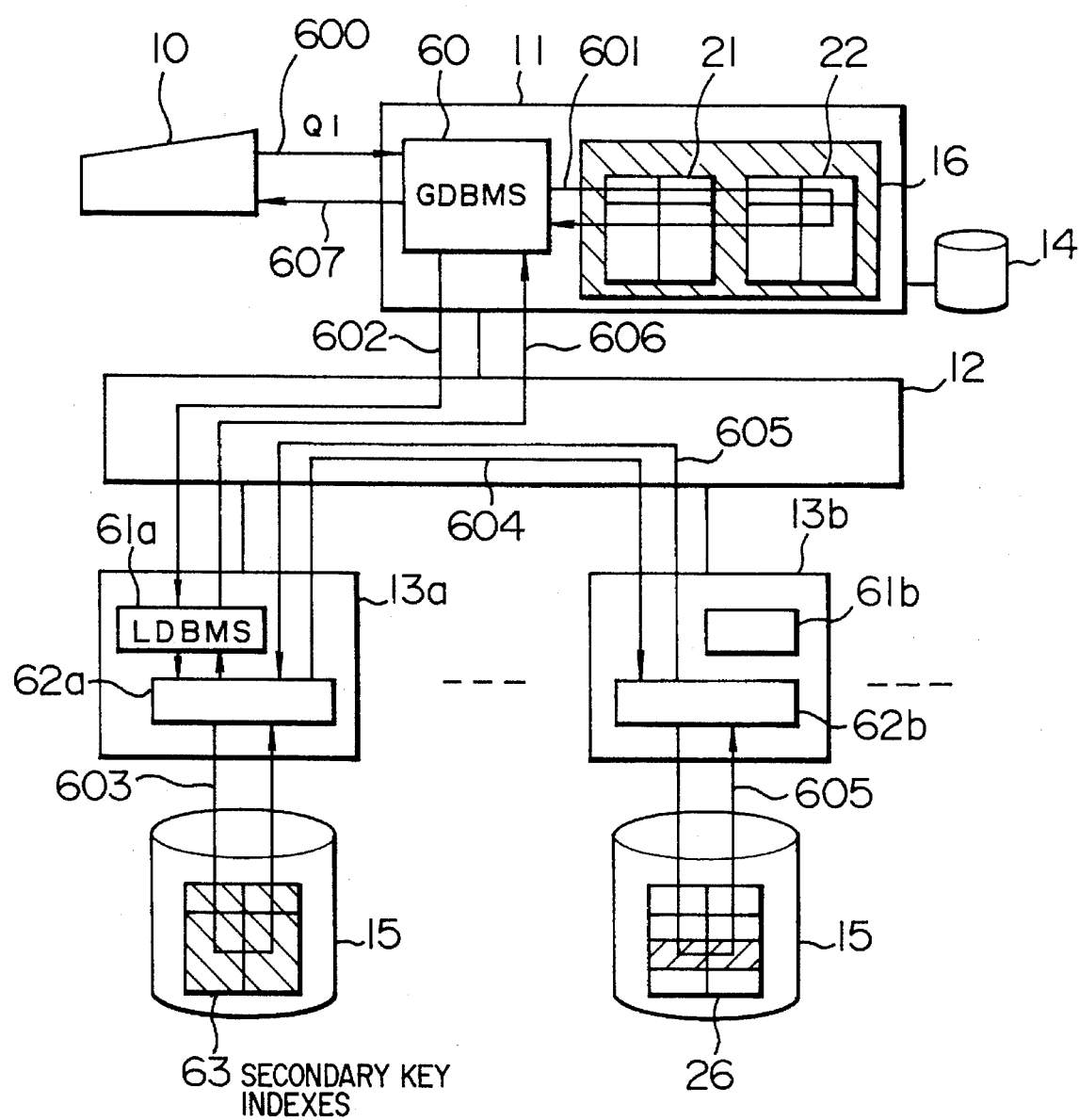
FIG. 9 is a schematic diagram explaining the operation of processing a table selection query with a secondary key of the second embodiment.

The table selection query with the secondary key of the second embodiment will be described with reference to FIG. 9. A table selection query Q1 with the secondary key entered from the terminal 10 is transferred to GDBMS 60 of the global database processing apparatus 11 (indicated at 600 in FIG. 9). While referring to the secondary key partition table 22, GDBMS 60 selects the local database processing apparatus, for example, apparatus 13a (indicated at 601), and transfers Q1 to its LDBMS 61a (indicated at 602). LDBMS 61a refers to the secondary key indexes 63 to obtain the physical location information of the target record including the LDBMS number and record location (indicated by 603). Next, the file access control unit 62a issues a remote file access request to the file access control unit 62b (indicated at 604). The file access control unit 62b accesses the record in the local table (indicated at 605), and transfers the read data back to LDBMS 61a via the file access control unit 62a (indicated at 605). The retrieved data is then transferred from LDBMS to GDBMS and to the terminal 10 (indicated at 606 and 607).

Figure 10:
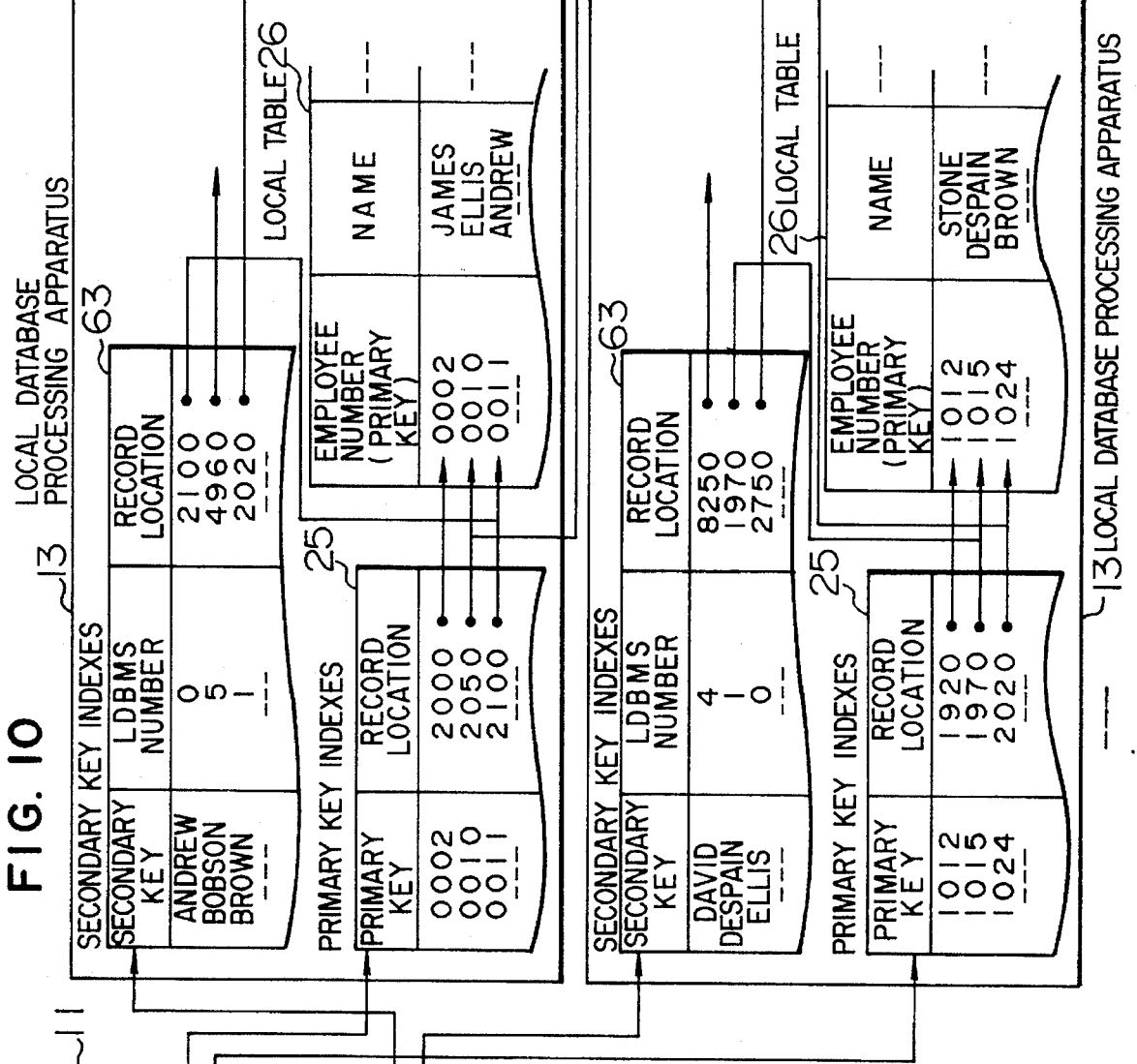
FIG. 10 shows the details of tables and indexes of the second embodiment.

FIG. 10 shows the details of the management information of various tables and indexes used in the second embodiment. The global database system 11 manages, like the first embodiment, the primary key partition table 21 and the secondary key partition table 22. The primary key partition table 21 is constituted by primary key groups and numbers of LDBMSs which respectively store records corresponding to the primary key groups. The secondary key partition table 22 is constituted by secondary key groups (A to C, D to F, . . . in the example shown in FIG. 10) and numbers of LDBMSs which respectively hold secondary key indexes corresponding to the secondary key groups. In this embodiment, these tables may be replaced by primal, and secondary hash functions like the first embodiment. The local database system 13 manages the local table 26, the primary key indexes 25 and the secondary key indexes 63. The primary key indexes 25 represent values of the primary keys and storage positions of the records corresponding to the primary keys. The secondary key indexes 63 represent values of the secondary keys, numbers of LDBMSs respectively having records corresponding to the values of the secondary keys, and storage positions of the records in the LDBMSs. A group of the secondary key indexes 63 held in each of the LDBMSs is a fragment of correspondence relations between the secondary keys and the primary keys of the records of all of the local tables which are fragmented based on the secondary key partition table 22. For example, the secondary key indexes 63 corresponding to the LDBMS number 0 are ones in a range of A to C of secondary keys. The second embodiment features include that the secondary key indexes 63 directly have the physical location information of a record corresponding to each secondary key, instead of the primary key corresponding to each secondary key. Accordingly, it is not necessary for the local database processing apparatus to have a copy of the primary partition table as in the first embodiment. Similar to the first embodiment, since the secondary key partition table 22 is provided in the global database processing apparatus 11, a table selection query is not necessary to broadcast to all of the LDBMSs. The second embodiment features also include that the selection query with the secondary key is processed only by LDBMS having the secondary key indexes accessed.

The management information of tables and indexes shown in FIG. 10 of the second embodiment is only illustrative, and other key partition tables and indexes configured by a hash table, B-tree, or the like may also be used.

Figure 11:
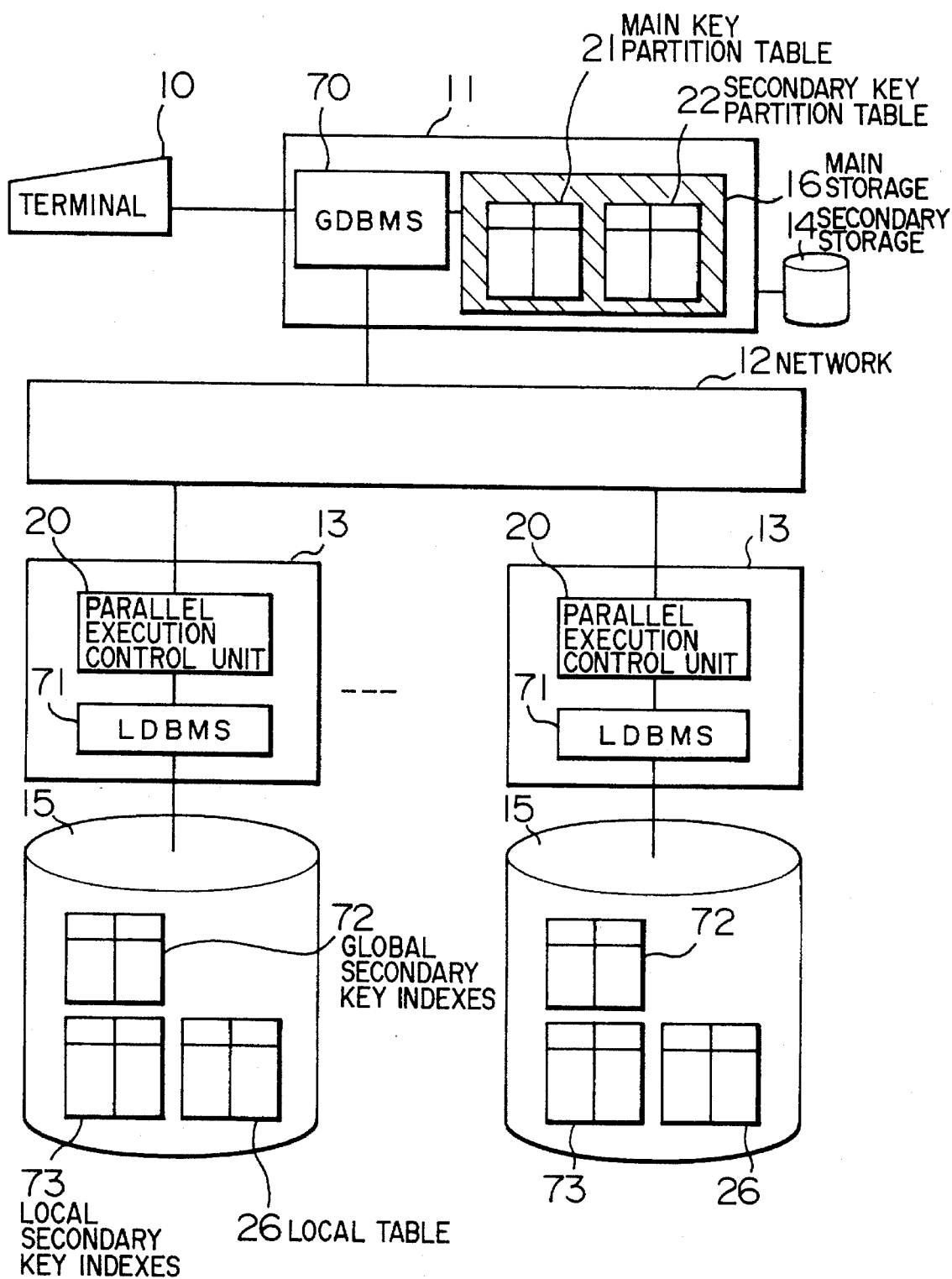
FIG. 11 is a block diagram showing the structure of a parallel database processing system according to a third embodiment of the present invention.

FIG. 11 shows the entire structure of a parallel database processing system according to the third embodiment of the invention. The third embodiment features include that the secondary key partition table 22 is newly provided and LDBMS of the local database processing apparatus 13 has global secondary key indexes 72 and local secondary key indexes 73. Similar to the second embodiment shown in FIG. 8, a copy of the primary key partition table is not necessary. Accordingly, this embodiment is effective when the integrity control of a plurality of distributed copies is difficult.

Figure 12:
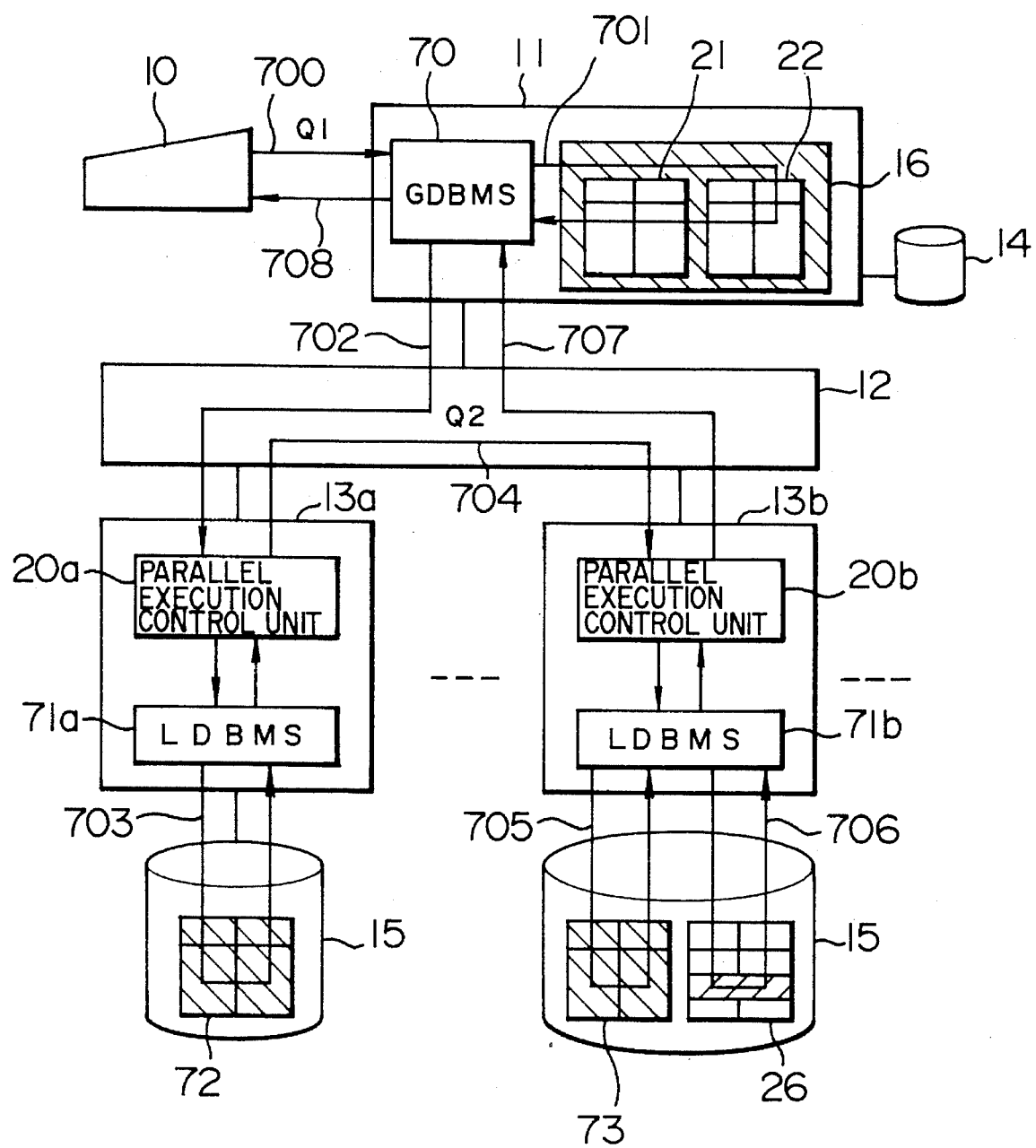
FIG. 12 is a schematic diagram explaining the operation of processing a table selection query with a secondary key of the third embodiment.

The table selection query with the secondary key of the third embodiment will be described with reference to FIG. 12. A table selection query Q1 with the secondary key entered from the terminal 10 is transferred to GDBMS 70 of the global database processing apparatus 11 (indicated at 700 in FIG. 12). While referring to the secondary key partition table 22, GDBMS 70 selects the local database processing apparatus, for example, apparatus 13a (indicated at 701), and transfers Q1 to its parallel execution control unit 20a (indicated at 702). The parallel execution control unit 20a transmits a search request to LDBMS 71a for searching the global secondary key indexes 72 in the local database processing apparatus 13a. LDBMS 71a then refers to the global secondary key indexes 72 to select the local database processing apparatus, for example, apparatus 13b having data for the secondary key (indicated at 703). A table selection query Q2 with the secondary key is transferred to the selected local database processing apparatus 13b (indicated at 704). Upon reception of the query Q2, the parallel execution control unit 20b transfers Q2 to LDBMS 71b. While referring to the local secondary key indexes 73, LDBMS 71b accesses the target record of the local table 26 (indicated at 706). The retrieved data is then transferred via the parallel execution control unit 20b to GDBMS 70 (indicated at 707) and to the terminal 10 (indicated at 708).

Figure 13:
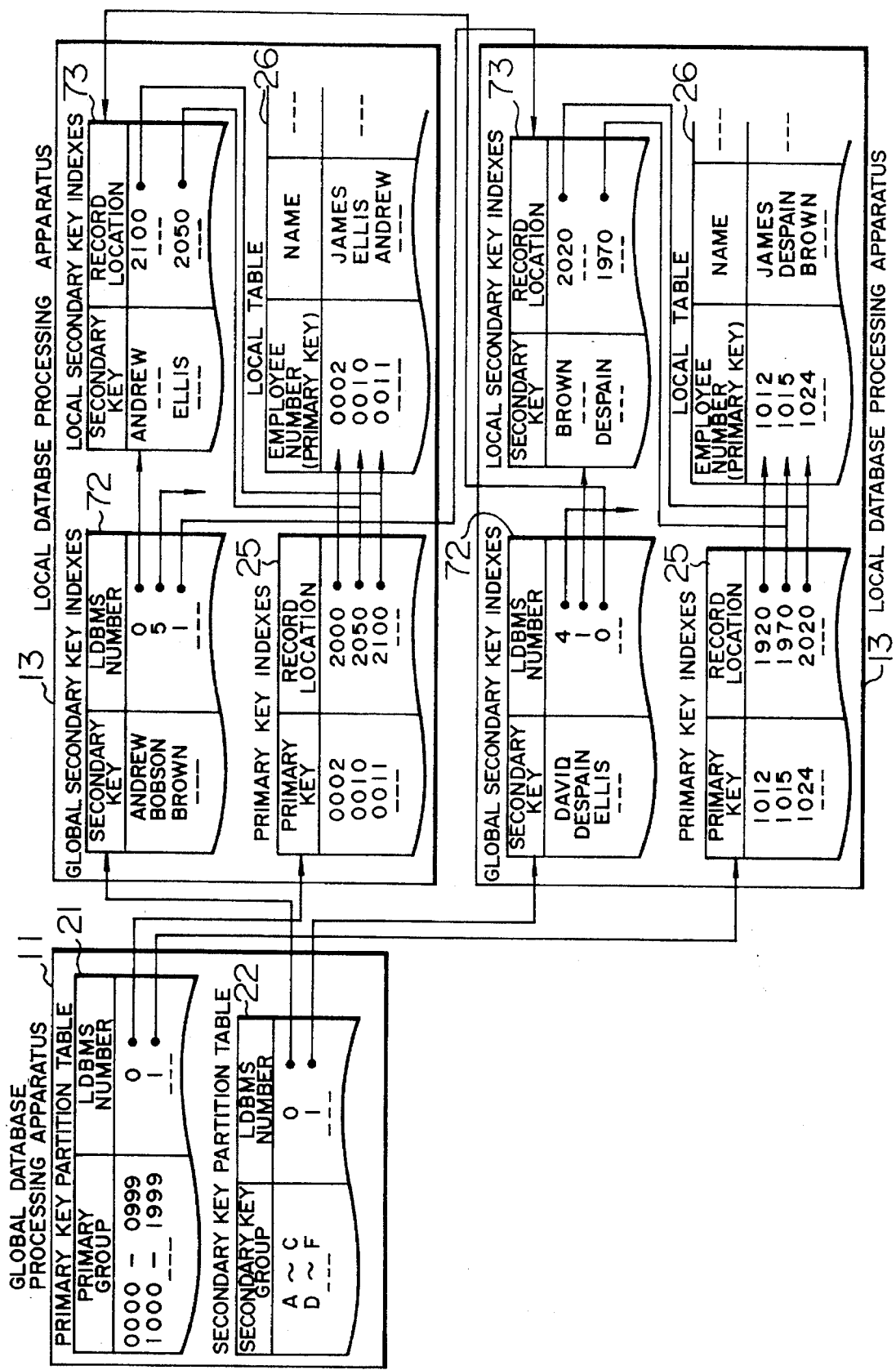
FIG. 13 shows the details of tables and indexes of the third embodiment.

FIG. 13 shows the details of the management information of various tables and indexes used in the third embodiment. The global database system 11 manages, like the first embodiment, the primary key partition table 21 and the secondary key partition table 22. The primary key partition table 21 is constituted by primary key groups and numbers of LDBMSs which respectively store records corresponding to the primary key groups. The secondary key partition table 22 is constituted by secondary key groups (A to C, D to F, . . . in the example shown in FIG. 13) and numbers of LDBMSs which respectively hold secondary key indexes corresponding to the secondary key groups. In this embodiment, these tables may be replaced by primary and secondary hash functions like the first embodiment. The local database system 13 manages the local table 26, the primary key indexes 25, the global secondary key indexes 72 and the local secondary key indexes 73. The primary key indexes 25 represent values of the primary keys and storage positions of the records corresponding to the primary keys. The global secondary key indexes 72 represent values of the secondary keys and numbers of LDBMSs respectively having records corresponding to the values of the secondary keys. The local secondary key indexes 73 represent physical storage positions of records associated with the local table 26 held in the corresponding LDBMS.

A group of the global secondary key indexes 72 held in each of LDBMSs is a fragment of correspondence relations between the secondary keys and the numbers of LDBMSs which are fragmented based on the secondary key partition table 22. For example, the global secondary key indexes 72 corresponding to the LDBMS number 0 are ones in a range of A to C of secondary keys. In the third embodiment, the secondary key indexes are managed by two hierarchical level indexes, namely, the global and local secondary key indexes 72 and 73. The global secondary key indexes 72 each indicate the LDBMS number storing the record corresponding to the secondary key. The local secondary key indexes 73 each indicate the physical location of a record corresponding to the secondary key, the record being stored in the local table 26 managed by LDBMS in concern. The management information of tables and indexes shown in FIG. 13 of the third embodiment is only illustrative, and other key partition tables and indexes configured by a hash table, B-tree, or the like may also be used.

Figure 7:
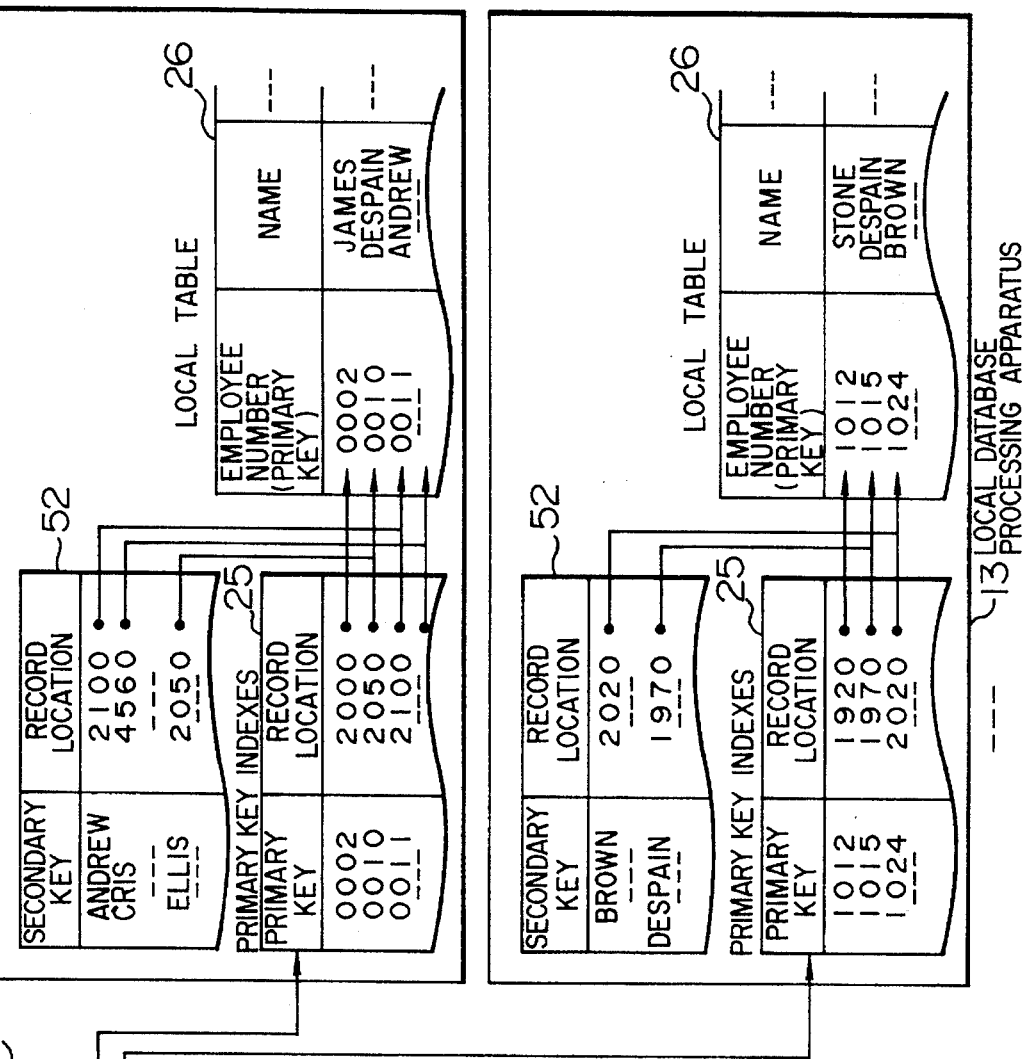
FIG. 7 shows the details of tables and indexes used by the system shown in FIG. 6.
Figure 7:
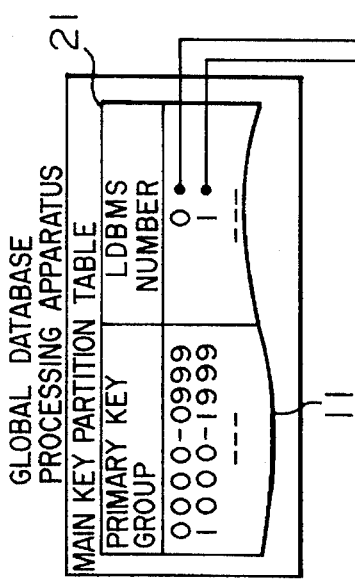

In the third embodiment, LDBMS is required to have both the global and local secondary key indexes so that the amount of index data becomes greater than the first and second embodiments. However, the selection query with the secondary key is not converted to the query with the primary key, speeding up the database processing correspondingly. Furthermore, each local database processing apparatus of the third embodiment is more highly independent than the conventional system shown in FIG. 7. It is therefore easy to apply this embodiment to previously configured databases. Similar to the first and second embodiments, since the secondary key partition table 22 is provided in the global database processing apparatus 11, a table selection query is not necessary to broadcast to all LDBMSs.

In the first to third embodiments, although the interface between the parallel execution control unit and LDBMS has not been described, this interface may be realized by using a standard database processing language. In this case, each parallel execution control unit analyzes a database processing request transmitted from another database processing apparatus, and issues a data access request to LDBMS using a standard database processing language. With such an arrangement, if the same interface is used for LDBMSs, a parallel database system can be configured on a network even if different LDBMSs on different computer systems are used.

Figure 14:
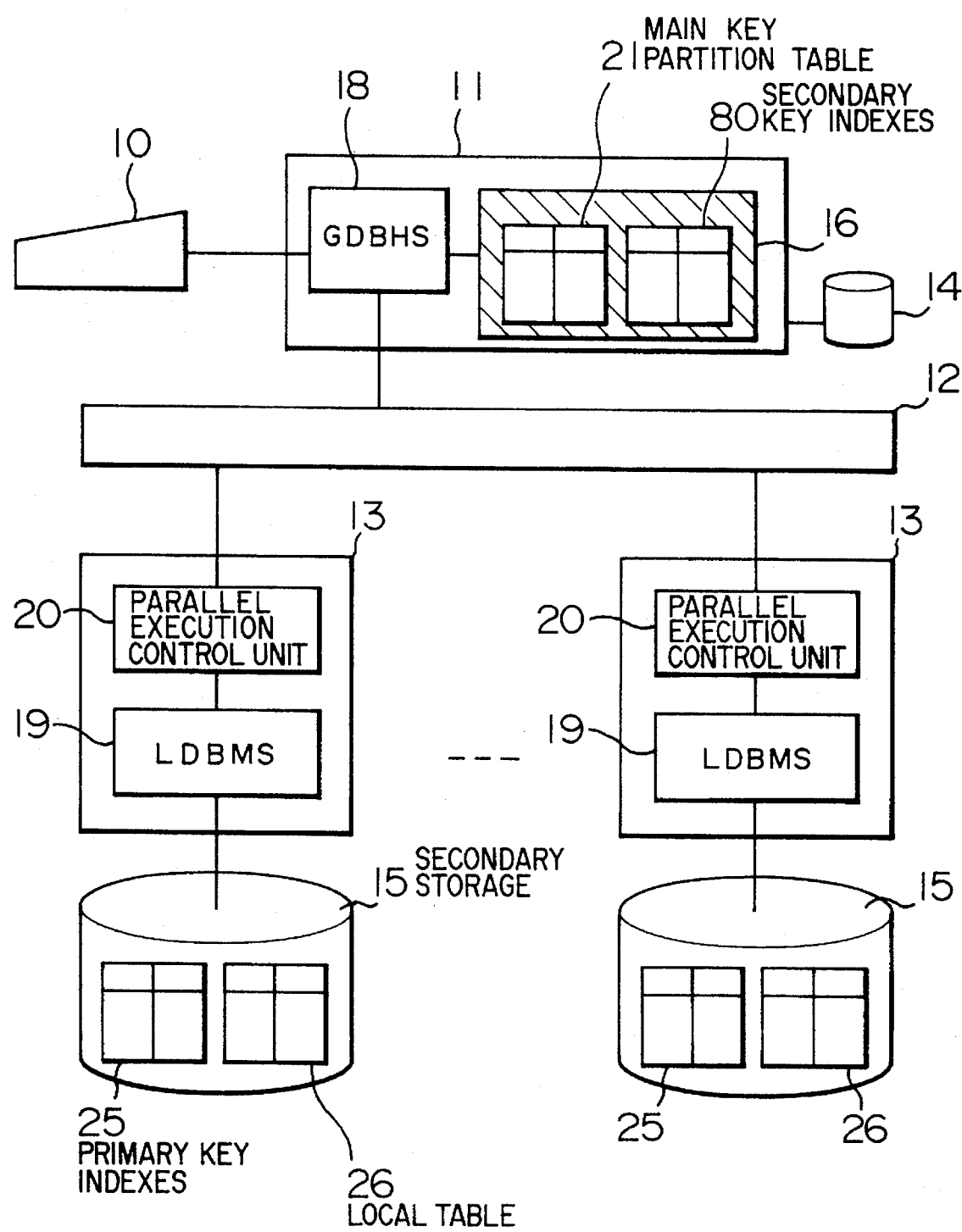
FIG. 14 is a block diagram showing the structure of a parallel database processing system according to a fourth embodiment of the present invention.

FIG. 14 shows the entire structure of a parallel database processing system according to the fourth embodiment of the present invention. In the fourth embodiment, the secondary key partition table 22 and secondary key indexes 23 of the first embodiment are replaced with complete secondary key indexes 80 provided in the global database processing apparatus 11.

Figure 15:
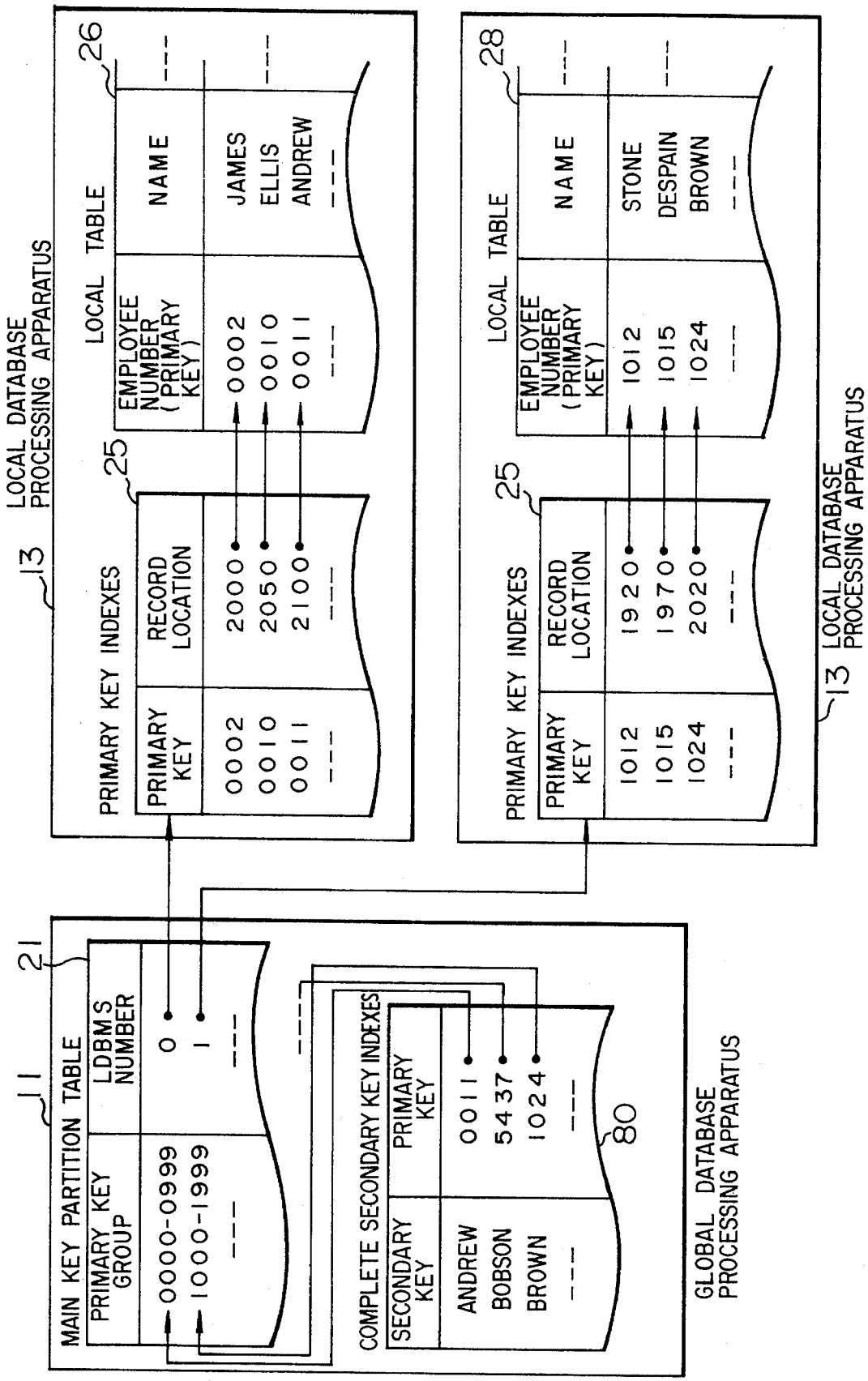
FIG. 15 shows the details of tables and indexes of the fourth embodiment.

FIG. 15 shows the details of the management information of tables and indexes used in the fourth embodiment. The global database system 11 manages the primary key partition table 21 and the complete secondary key indexes 80. The primary key partition table 21 is constituted by primary key groups and numbers of LDBMSs which respectively store records corresponding to the primary key groups. The complete secondary key indexes 80 are constituted by values of the secondary keys of all records and values of the primary keys of records corresponding to the values of the secondary keys. The local database system 13 manages the local table 26 and the primary key indexes 25. The primary key indexes 25 represent values of the primary keys and storage positions of the records corresponding to the primary keys. As shown in FIG. 15, the complete secondary key indexes 80 are an aggregate of a plurality group of secondary key indexes 23 which are otherwise distributed to a plurality of local database processing apparatuses 13. The same correspondence between primary and secondary keys is incorporated as in the first embodiment. With this arrangement, the conversion from the query with the secondary key into the query with the primary key executed by the local database processing apparatus 13 in the first embodiment can be performed within the global database processing apparatus. The copy 24 of the primary key partition table is not necessary.

Figure 16:
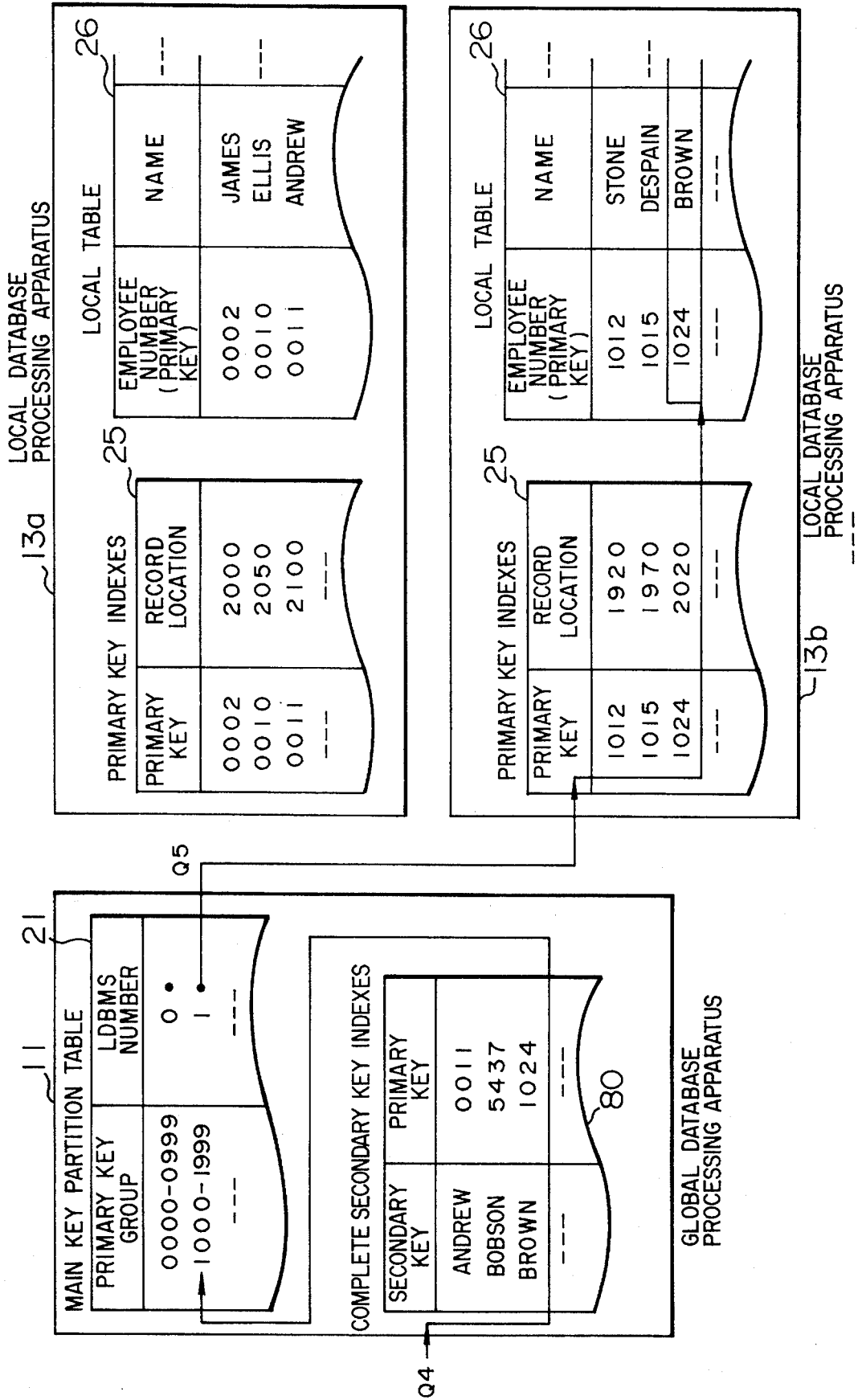
FIG. 16 is a schematic diagram explaining the operation of processing a table selection query with a secondary key of the fourth embodiment.

An example of processing a table selection query with the secondary key of the fourth embodiment will be described with reference to FIG. 16. Consider now the case of issuing a table selection query Q4 by using an employee name "Brown" as the secondary key. First, the primary key (employee number "1024") is searched from the secondary key indexes 80 to convert Q4 into a table selection query Q5 with the primary key. While referring to the primary key partition table 11, the LDBMS number (in this case "1") at the primary key group containing the concerned primary key and corresponding to the target record is obtained, and Q5 is transmitted to the local database processing apparatus 13b. Upon reception of Q5, the local database processing apparatus 13b refers to the primary key indexes 25 to access and retrieve the target record.

Also in the fourth embodiment, the communications between the global and local database processing apparatuses are realized on the database processing language level without using the record physical location. The selection query with the second key can be processed by accessing only the local database processing apparatus having the target record. Furthermore, the selection query with the secondary key can be converted into the query with the primary key by using the complete secondary key indexes. Conventional secondary key indexes indicating the physical locations of records are not necessary.

Figure 17A:
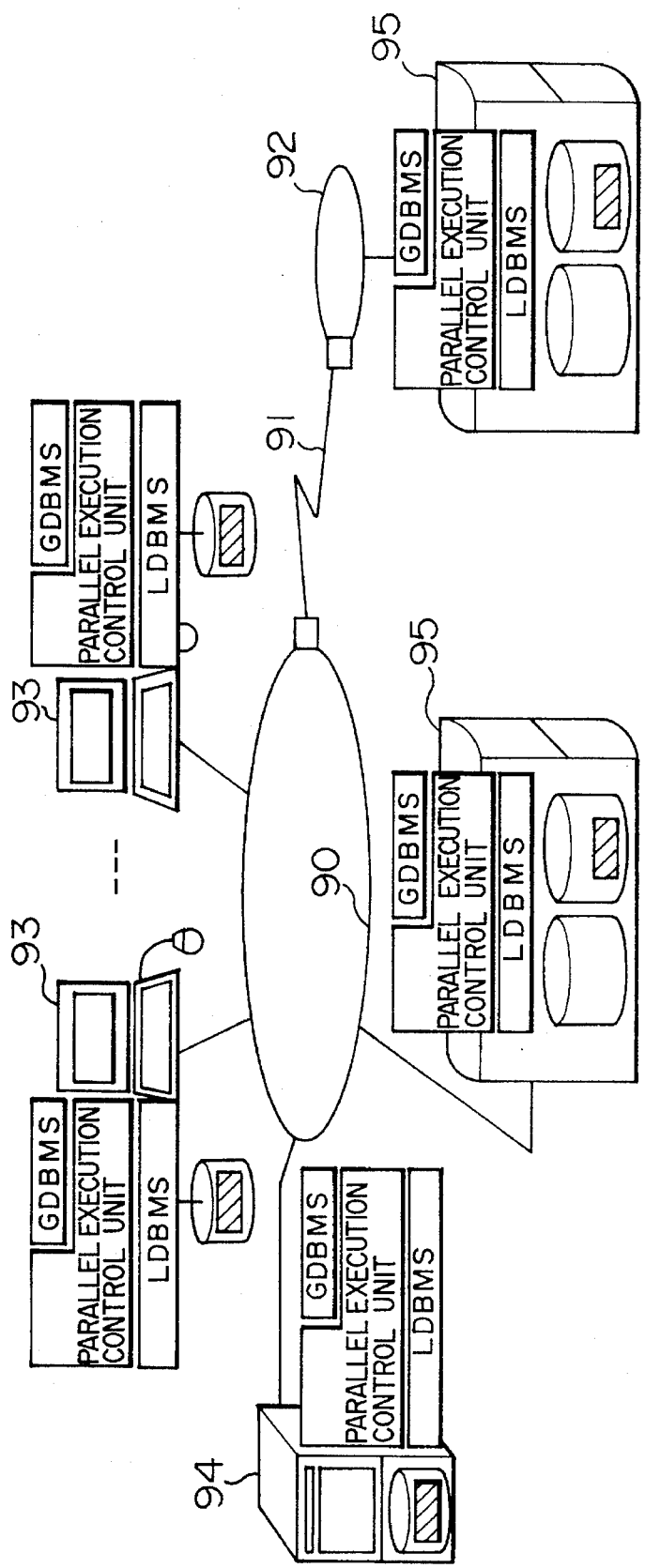
FIG. 17A is a block diagram showing the structure of a computer system according to a fifth embodiment of the present invention.
Figure 17B:
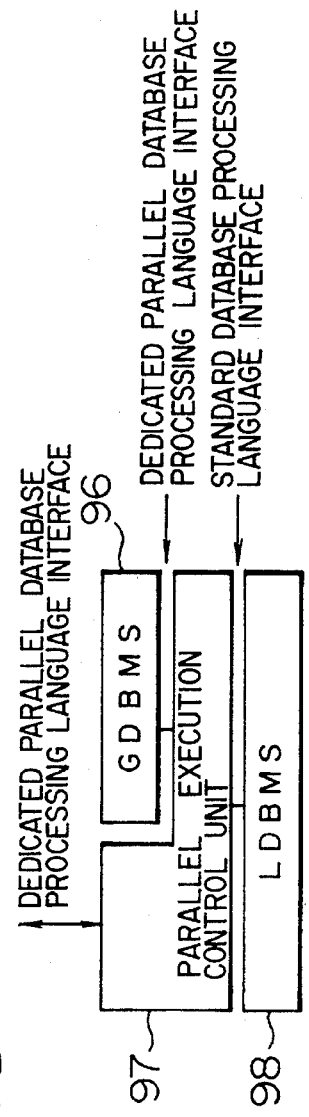
FIG. 17B is a block diagram showing the structure of each computer of the fifth embodiment.

FIGS. 17A and 17B are schematic diagrams showing a parallel database system according to the fifth embodiment of the present invention. FIG. 17A shows the system configuration. This system is a distributed computer system wherein a plurality of computers such as work stations 93, file servers 94 and general large computers 95 are interconnected by a high speed network 90 and by another high speed network 92 via a communication line 91. FIG. 17B shows the elements of each computer connected to the system and interfaces between the elements. In this embodiment, the elements of each computer include LDBMS 98 providing a standard database processing language interface, a parallel execution control unit 97, and GDBMS 96 providing a global database management. The standard database processing language interface is used between LDBMS 98 and the parallel execution control unit 97. A dedicated parallel database processing language interface is used between the parallel execution control unit 97 and. GDBMS 96 and between the parallel execution control unit 97 and another computer's unit 97. With this architecture, it is possible to use an already configured database system as LDBMS of the parallel database processing system of this invention. The parallel database system of the above-described embodiments may be used as a computer system of this embodiment. The functions of GDBMS, LDBMS, and parallel execution control unit of this embodiment are basically the same as those described with the first to fourth embodiments.

The fifth embodiment features include that GDBMS is installed at each computer. GDBMS of each computer manages tables generated only by GDBMS. From each computer, all the other computers are viewed as LDBMSs. Namely, GDBMS can use data managed thereby as well as other data managed by other GDBMSs. With this arrangement, contention between GDBMSs can be avoided. Since LDBMSs operate independently, a table of small capacity may be locally stored in one LDBMS of a computer, and only a table of large capacity with a number of records may be distributed to computers of the system. Such a computer system realizes an efficient parallel database processing system.

Figure 18:
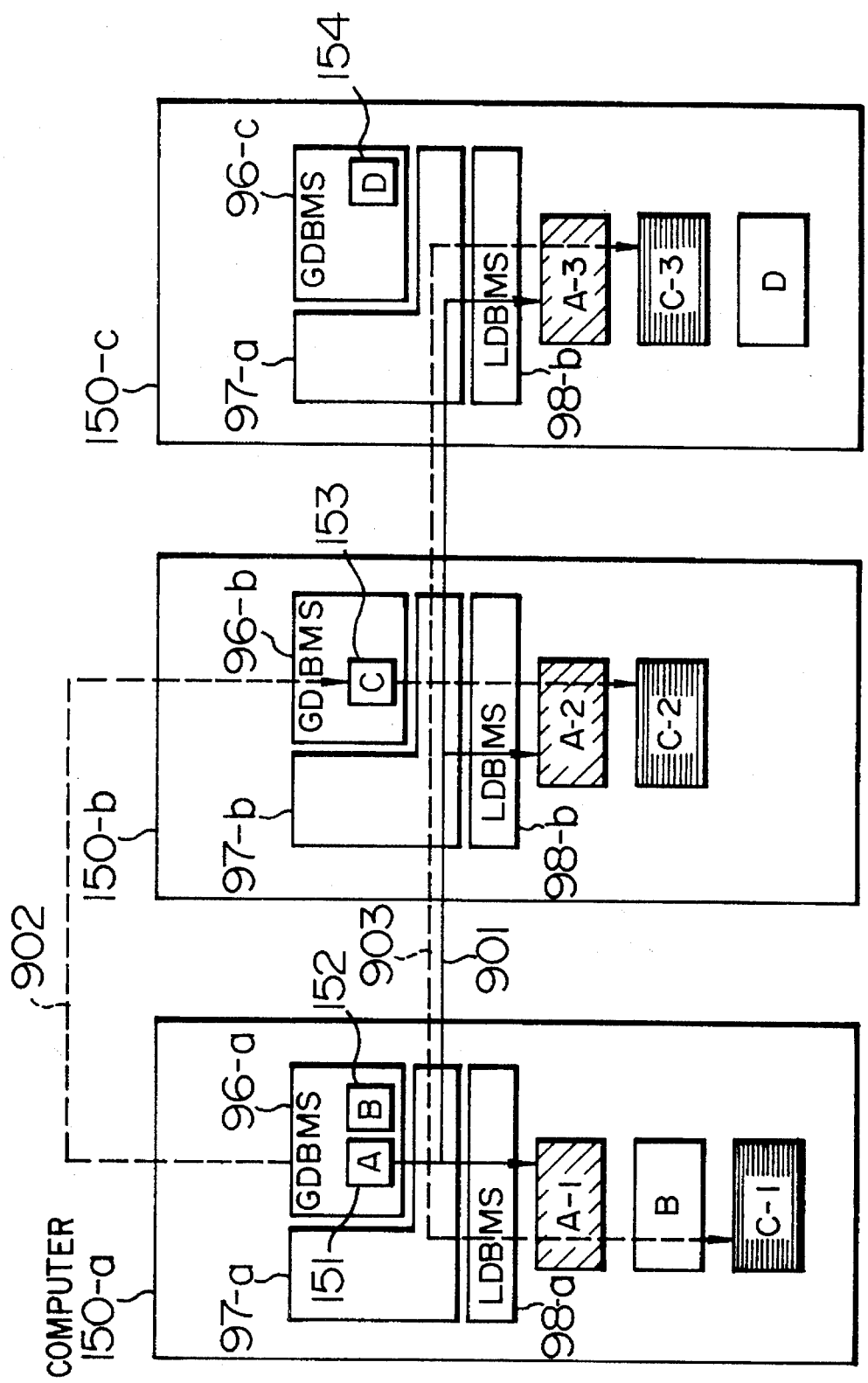
FIG. 18 is a schematic diagram explaining a table selection method of the fifth embodiment.

FIG. 18 illustrates the method of accessing a table according to the fifth embodiment. For the simplicity of description, only three computers 150-a, 150-b, and 150-c corresponding to the computers 93, 94, and 95 shown in FIG. 17A are shown interconnected by the network. The computers 150-a, 150-b, and 150-c have respective GDBMSs 96-a, 96-b, and 96-c, parallel execution control units 97-a, 97-b, and 97-c, and LDBMSs 98-a, 98-b, and 98-c. GDBMSs of the computers have database management tables 151, 152, 153, and 154 for managing tables A, B, C, and D generated by the computers. Each database management table stores the management information of each database. Tables distributed to computers are primary key partition tables and secondary key partition tables. In this embodiment, for example, the database management tables A and B 151 and 152 generated by the computer 150-a are stored in GDBMS 96-a. Table A is distributed to and stored in the computers 150-a, 150-b, and 150-c, as tables A-1, A-2, and A-3. Table B is locally stored in the computer 150-a. The database management table C 153 is stored in GDBMS 96-b of the computer 150-b. Table C is distributed to and stored in the computers 150-a, 150-b, and 150-c, as tables C-1, C-2, and C-3. The database management table D 154 is stored in GDBMS 96-c of the computer 150-c. Table D is locally stored in the computer 150-c.

In accessing the table A from the computer 150-a, the database management table A 151 in GDBMS 96-a is referred to access the tables A-1 to A-3 distributed to the computers 150-a to 150-c. In accessing the tables A-2 and A-3 distributed to the other computers 150-b and 150-c, the parallel execution control unit 97-a activates the parallel execution control units 97-b and 97-c of the computers 150-b and 150-c via a communications line 901 of the network.

In accessing the table C generated by the computer 150-b from the computer 150-a, an access request for the table C is transferred from GDBMS 96-a of the computer 150-a to GDBMS 96-b of the computer 150-b via the network communications line 903. The parallel execution control unit 97-b of GDBMS 96-b then accesses the table C-2, and accesses the tables C-1 and C-3 via the network communications line 903 by way of the computers 150-a and 150-c and their parallel execution control units 97-a and 97-c. Record information obtained by accessing the tables C-1 to C-3 is sent from the computer 150-a to the computer 150-a via the communication line 901 or 903.

In the above manner, not every GDBMS is necessary to manage tables generated by other GDBMSs, retaining the independence of table management between GDBMSs.

Figure 19:
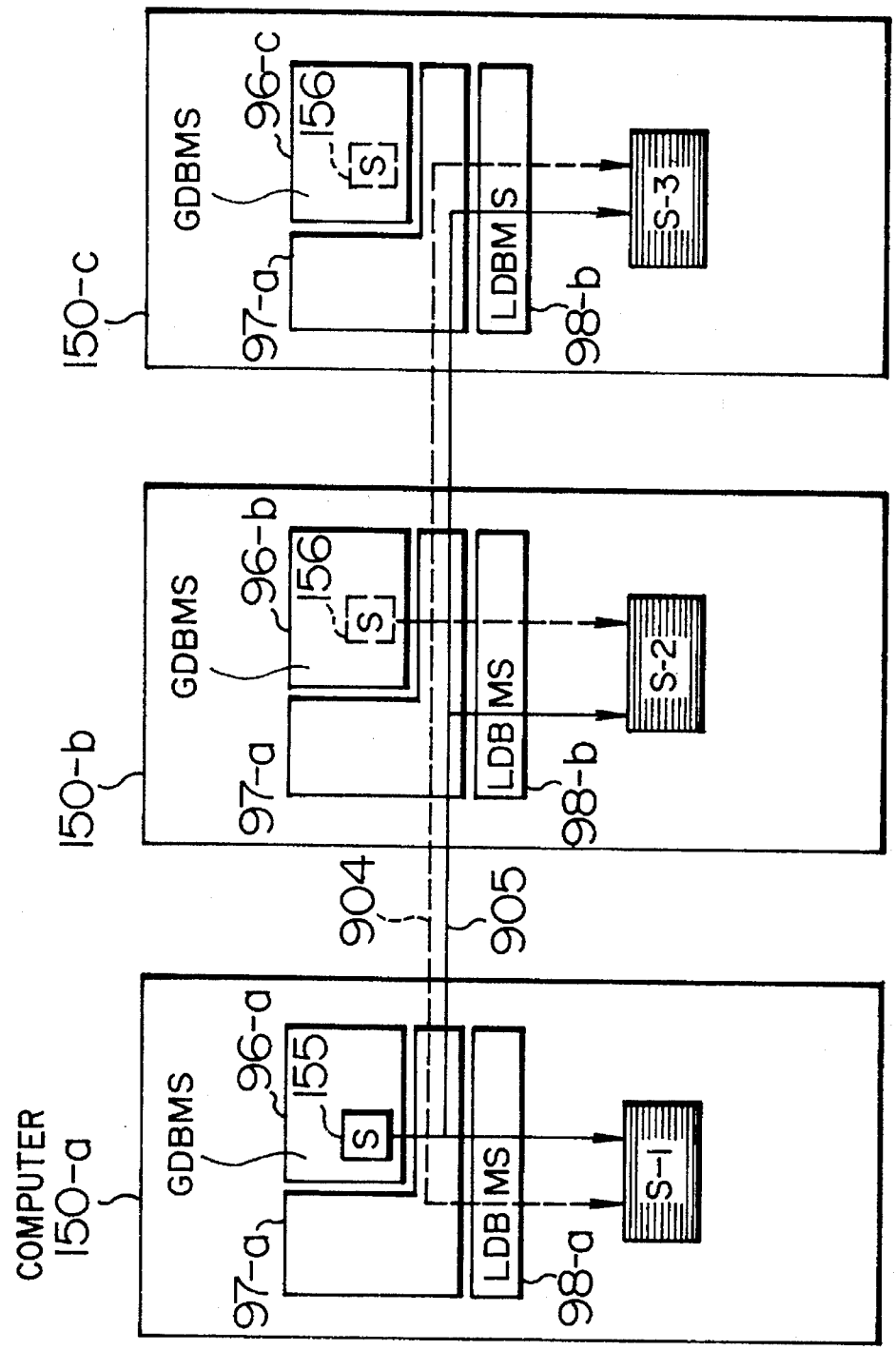
FIG. 19 is a schematic diagram explaining another table selection method of the fifth embodiment.

In this embodiment, if a read-only table S, unnecessary for updating, is shared by a plurality of computers, the table access speed can be made high by the following method. FIG. 19 illustrates the table S generated by the computer 150-a and shared by a plurality of computers. Copies 156 of the database management table S 155 generated by the computer 150-a are sent in advance to other computers. Table S is distributed to and stored in the computers 150-a to 150-c as tables S-1, S-2, and S-3.

In accessing the table S from the computer 150-a, the database management table S 155 in GDBMS 96-a is referred to access the table S-1, and accesses the tables S-2 and S-3 of the computers 150-b and 150-c via a network communications line 905.

In accessing the table S from the computer 150-b, the copy 156 of the table S in GDBMS 96-b is referred to access the table S-2, and accesses the tables S-1 and S-3 via a network communications line 904 by way of the computers 150-a and 150-c.

In the above manner, it is possible to access the table S directly from the computer 150-b. The same control is executed in accessing the table S from the computer 150-c.

As described so far, in the parallel database processing system of the present invention, the secondary key partition table or complete secondary key indexes indicating which local database processing apparatus has the target secondary index are stored in the global database processing apparatus. It is therefore unnecessary to broadcast the table selection query with the secondary key to all local database processing apparatuses. Furthermore, by converting the query with the secondary key into the query with the primary key, it is possible to change the physical location of a local table only by changing the primary key index, making it easy to use the standard database processing language.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of retrieving a database by using a secondary key in a parallel database processing system having global database processing means, a plurality of local database processing means, and a network interconnecting said global database processing means and a plurality of said local database processing means, wherein one table containing a number of records is partitioned into local tables on the basis of values of primary keys, each of said local tables being provided in a corresponding one of said local database processing means, said global database processing means including a primary key partition table responsive to a retrieval request with one of said primary keys for identifying one of said plurality of local database processing means having said local table corresponding to said one of said primary keys, primary key indexes representing correspondence between the values of said primary keys for all records in said one table and storage locations of all records in said local tables being partitioned on the basis of said primary keys into local primary key indexes, each set of local primary key indexes being provided in a corresponding one of said plurality of local database processing means having a corresponding one of said local tables, so that said retrieval request with said primary key received by said global database processing means is transferred to a corresponding one of said plurality of local database processing means with reference to said primary key partition table and said corresponding one of said plurality of local database processing means converts the transferred retrieval request with said primary key into a storage location corresponding to said transferred retrieval request with reference to its own set of local primary key indexes to access its own local table based on said storage location thus converted to obtain a record corresponding to said retrieval request with said primary keys, secondary key indexes representing correspondence between the values of secondary keys for all records in said one table and access information to said records corresponding to said secondary keys are partitioned on the basis of said values of said secondary keys into local secondary key indexes, each set of said local secondary key indexes being provided in a corresponding one of said local database processing means, and identifying means is provided in said global database processing means, said identifying means being responsive to a retrieval request with said secondary key identifying said local database processing means having said local secondary key index corresponding to said secondary key, said method comprising the steps of:

a) at said global database processing means, receiving said retrieval request with said secondary key, causing said identifying means to identify the one of said local database processing means having said local secondary key index corresponding to said secondary key, and transferring said retrieval request with said secondary key to said identified one of said local database processing means; and b) at said identified local database processing means, referring to its own said local secondary key indexes, obtaining said access information corresponding to said transferred retrieval request with said secondary key, and processing said retrieval request with said secondary key by using said access information so that said local table corresponding to said retrieval request with said secondary key is accessed.

2. A method of retrieving a database by using a secondary key in a parallel database processing system according to claim 1, wherein said step b) includes the substeps of:

at said identified local database processing means, identifying said local database processing means corresponding to said obtained access information; and at said local database processing means corresponding to said obtained access information, accessing its own said local table to obtain information of a target record.

3. A method of retrieving a database by using a secondary key in a parallel database processing system according to claim 1, wherein said identifying means is a table indicating correspondence between secondary key groups and corresponding ones of local database processing means having said local secondary key indexes corresponding said secondary key groups.

4. A method of retrieving a database by using a second key in a parallel database processing system according to claim 1, wherein said second key indexes represent correspondence between the values of said secondary keys for all records and the values of said primary keys as said access information to said records corresponding to said secondary keys, and said step b) includes substep:

b1) at said identified local database processing means, obtaining a primary key corresponding to said transferred retrieval request with said secondary key with reference to its own said local secondary indexes and selecting one of said plurality of local database processing means corresponding to said obtained primary key, b2) at said selecting local database processing means, with reference to its own local primary key indexes, obtaining a storage location of the record corresponding to said obtained primary key, and b3) at said selected local database processing means, accessing its own local table based on said obtained storage location to obtain a target record.

5. A method of retrieving a database by using a second key in a parallel database processing system according to claim 4, wherein each of said plurality of local database processing means includes a copy of said primary key partition table and said substep b1) includes a substep of, at said identified local database processing means, selecting one of said plurality of local database processing means corresponding to said obtained primary key with reference to its own copy of said primary key partition table.

6. A method of retrieving a database by using a second key in a parallel database processing system according to claim 1, wherein said second key indexes represent correspondence between the values of said secondary keys for all records in said one table and the storage locations of said all records in said local tables as said access information to said records corresponding to said second secondary keys, and said step b) includes substeps b1) at said identified local database processing means, obtaining a storage location corresponding to said transferred retrieval request with said secondary key with reference to its own said local secondary indexes and selecting one of said plurality of local database processing means corresponding to one of said local tables having said obtained storage location, and b2) at said selected local database processing means, for accessing its own local table based on said obtained storage location to obtain a target record.

7. A method of retrieving a database by using a secondary key in a parallel database processing system having global database processing means, a plurality of local database processing means, and a network interconnecting said global database processing means and a plurality of said local database processing means, wherein one table containing a number of records is partitioned into local tables on the basis of values of primary keys, each of said local tables being provided in a corresponding one of said local database processing means, said global database processing means including a primary key partition table responsive to a retrieval request with one of said primary keys for identifying one of said plurality of local database processing means having said local table corresponding to said one of said primary keys, primary key indexes representing correspondence between the values of said primary keys for all records in said one table and storage locations of all records in said local tables being partitioned on the basis of said primary keys into local primary key indexes each set of local primary key indexes being provided in a corresponding one of said plurality of local database processing means having a corresponding one of said local tables, so that said retrieval request with said primary key received by said global database processing means is transferred to a corresponding one of said plurality of local database processing means with reference to said primary key partition table and said corresponding one of said plurality of local database processing means converts the transferred retrieval request with said primary key into a storage location corresponding to said transferred retrieval request with reference to its own set of local primary key indexes to access its own local table based on said storage location thus converted to obtain a record corresponding to said retrieval request with said primary keys and secondary key indexes representing correspondence between the values of secondary keys for all records in said one table and said primary keys are provided in said global database processing means or distributed in said plurality of local database processing means, said method comprising the step of:

a) at either said global database processing means and said local database processing means, receiving said retrieval request with said secondary key, referring to said secondary key indexes and converting said retrieval request with said secondary key into a retrieval request with said primary key so that said local table corresponding to said retrieval request with said primary key is accessed.

8. A method of retrieving a database by using a secondary key in a parallel database processing system according to claim 7, wherein said secondary key indexes are partitioned on the basis of said values into local secondary key indexes, each set of said local secondary key indexes being provided in a corresponding one of said local database processing means, and first identifying means are provided in said global database processing means, said first identifying means being responsive to said retrieval request with said secondary key identifying said local database processing means having said local secondary key index corresponding to said secondary key, and wherein said step a) includes the substeps of:

b) at said global database processing means, receiving said retrieval request with said secondary key, causing said first identifying means to identify said local database processing means having said local secondary key index corresponding to said secondary key, and transferring said retrieval request with said second key to said identified local database processing means; and c) at said identified local database processing means, referring to said local secondary key indexes stored in said identified local database processing means, and converting said transferred retrieval request with said secondary key into a retrieval request with said primary key.

9. A method of retrieving a database by using a secondary key in a parallel database processing system according to claim 8, wherein second identifying means, which is a copy of said primary key partition table, are provided in each of said local database processing means, said second identifying means responsive to said retrieval request with said primary key identifying said local database processing means having a record corresponding to said primary key, and wherein said step a) further includes a substep of:

at said identified local database processing means, responding to said retrieval request with said primary key, causing said second identifying means of said identified local database processing means to identify said local database processing means having a target record, and at said local database processing means identified by said second identifying means, accessing said local table at the location corresponding to said primary key.

10. A method of retrieving a database by using a secondary key in a parallel database processing system according to claim 9, wherein said second identifying means is a table indicating correspondence between said primary keys and corresponding ones of said local database processing means having said records corresponding to said primary keys, said table is provided in said global database processing means, and a copy of said table is provided in each said local database processing means.

11. A method of retrieving a database by using a secondary key in a parallel database processing system according to claim 8, wherein said step a) further includes the substeps of:

if said local database processing means identified by said second identifying means is different from said local database processing means identified by said first identifying means, transferring said retrieval request with said primary key from said local database processing means identified by said first identifying means to said local database processing means identified by said second identifying means via said network; and at said local database processing means identified by said second identifying means, accessing said local table at the location corresponding to said transferred retrieval request with said primary key.

12. A method of retrieving a database by using a secondary key in a parallel database processing system according to claim 7, wherein:

said secondary key indexes are provided in said global database processing means;

identifying means are provided in said global database processing means, said identifying means being responsive to said primary key identifying said local database processing means corresponding to said primary key; and primary key indexes are provided in each of said local database processing means, said primary key indexes indicating the storage locations of records stored in said local table and corresponding to said primary keys, and wherein said stem a) includes the substeps of:

at said global database processing means, referring to its own said secondary key indexes, converting said retrieval request with said secondary key into a retrieval request with said primary key, responding to said retrieval request with said primary key, causing said identifying means to identify said local database processing means corresponding to said primary key, and transferring said retrieval request with said primary key to said identified local database processing means; and at said identified local database processing means, referring to its own said primary key indexes, and accessing said local table in accordance with said transferred retrieval request with said primary key.

13. A parallel database processing system having global database processing means, a plurality of local database processing means, and a network interconnecting said global database processing means and a plurality of said local database processing means, one table containing a number of records being partitioned into local tables on the basis of values of primary keys, each of said local tables being provided in each of said local database processing means, said global database processing means including a primary partition table responsive to a retrieval request with one of said primary keys for identifying one of said plurality of local database processing means having said local table corresponding to said one of said primary keys, primary key indexes representing correspondence between the values of said primary keys for all records in said one table and storage locations of all records in said local tables being partitioned on the basis of said primary keys into local primary key indexes each set of local primary key indexes being provided in a corresponding one of said plurality of local database processing means having a corresponding one of said local tables, so that said retrieval request with said primary key received by said global database processing means is transferred to a corresponding one of said plurality of local database processing means with reference to said primary key partition table and said corresponding one of said plurality of local database processing means converts the transferred retrieval request with said primary key into a storage location corresponding to said transferred retrieval request with reference to its own set of local primary key indexes to access its own local table based on said storage location thus converted to obtain a record corresponding to said retrieval request with said primary keys wherein secondary key indexes representing correspondence between the values of secondary keys for all records in said one table and access information to said records corresponding to said secondary keys, are partitioned on the basis of said values of said secondary keys into fragmented secondary key indexes, each set of said fragmented secondary key indexes being provided in a corresponding one of said local database processing means, said global database processing means includes:

identifying means responsive to a retrieval request with said secondary key for identifying said local database processing means having said fragmented secondary key index corresponding to said secondary key; and means for receiving said retrieval request with said secondary key, causing said identifying means to identify said local database processing means having said fragmented secondary key index corresponding to said secondary key, and transferring said retrieval request with said secondary key to said identified local database processing means, and wherein each of said local database processing means includes access means for referring to its own said fragmented secondary key indexes, obtaining said access information corresponding to said transferred retrieval request with said secondary key, and processing said retrieval request with said secondary key by using said access information so that said local table corresponding to said retrieval request with said secondary key is accessed.

14. A parallel database processing system according to claim 13, wherein global secondary key indexes are partitioned on the basis of the values of said secondary keys into fragmented global secondary key indexes, each set of said fragmented global secondary key indexes being provided in a corresponding one of said local database processing means, said global secondary key indexes indicating correspondence between the values of said secondary keys of all records in said one table and said local database processing means having said local tables storing said records corresponding said secondary keys, each said local database processing means having local secondary key indexes indicating correspondence between said secondary keys of said records stored in its own said local table and the locations of said records, said local secondary key indexes and said global secondary key indexes in each said local database processing means constituting said fragmented secondary key indexes, and wherein said access means in said local database processing means includes:
means for identifying said local database processing means as said access information while referring to said fragmented global secondary key indexes, said identified local database processing means having said local secondary key indexes containing said secondary key in said transferred retrieval request;
means for transferring said transferred retrieval request with said secondary key to a remote one of said local database processing means via said network if said identified local database processing means is said remote one; and
means for accessing a target record for said transferred retrieval request with said secondary key while referring to its own said fragmented secondary key indexes if said identified local database processing means is its own said local database processing means.

15. A parallel database system according to claim 13, wherein said access means of said local database processing means accesses said local table for said retrieval request with said secondary key by using a standard database processing language, if said access information indicates an access to its own said local database processing means, and transfers said retrieval request with said secondary key to a remote one of said local database processing means via said network by using said standard database processing language, if said access information indicates an access to said remote one.

16. A parallel database processing system according to claim 13, wherein said fragmented secondary key indexes of each said local database processing means are a fragment of a plurality set of secondary key indexes partitioned on the basis of the values of said secondary keys, said secondary key indexes indicating correspondence among the values of said secondary keys of all records of said table, identifications of said local database processing means storing said records, and the locations of said records, and said access means of said local database processing means includes means for directly accessing said local table of a remote one of said local database processing means via said network, if said access information obtained in response to said transferred retrieval request with said secondary key, as said local database processing means storing a target record for said secondary key and the location of said record, indicates an access to said remote one.

17. A parallel database processing system having global database processing means, a plurality of local database processing means, and a network interconnecting said global database processing means and a plurality of said local database processing means, one table containing a number of records being partitioned into local tables on the basis of values of primary keys, each of said local tables being provided in each of said local database processing means, said global database processing means including a primary key partition table responsive to a retrieval request with one of said primary keys for identifying one of said plurality of local database processing means having said local table corresponding to said one of said primary keys, primary key indexes representing correspondence between the values of said primary keys for all records in said one table and storage locations of all records in said local tables being partitioned on the basis of said primary keys into local primary key indexes each set of local primary key indexes being provided in a corresponding one of said plurality of local database processing means having a corresponding one of said local tables, so that said retrieval request with said primary key received by said global database processing means is transferred to a corresponding one of said plurality of local database processing means with reference to said primary key partition table and said corresponding one of said plurality of local database processing means converts the transferred retrieval request with said primary key into a storage location corresponding to said transferred retrieval request with reference to its own set of local primary key indexes to access its own local table based on said storage location thus converted to obtain a record corresponding to said retrieval request with said primary keys wherein secondary key indexes representing correspondence between the values of secondary keys for all records in said one table and said primary keys, are partitioned on the basis of said values of said secondary keys into fragmented secondary key indexes, each set of said fragmented secondary key indexes being provided in a corresponding one of said local database processing means, wherein said global database processing means includes:

identifying means, responsive to a retrieval request with said secondary key, for identifying said local database processing means having said fragmented secondary key index corresponding to said secondary key; and means for receiving said retrieval request with said secondary key, causing said identifying means to identify said local database processing means having said fragmented secondary key index corresponding to said secondary key, and transferring said retrieval request with said secondary key to said identified local database processing means, and wherein each said local database processing means includes access means for referring to its own said fragmented secondary key indexes, converting said transferred retrieval request with said secondary key into a retrieval request with said primary key so that so that said local table corresponding to said retrieval request with said primary key is accessed.

18. A parallel database processing system according to claim 17, wherein each said local database processing means further includes second identifying means, which is a copy of said primary key partition table, responsive to said converted retrieval request with said primary key for identifying said local database processing means having a record corresponding to said primary key, and said access means of said local database processing means includes means responsive to said converted retrieval request with said primary key for transferring said retrieval request with said primary key to a remote one of said local database processing means via said network if said local database processing means identified by said second identifying means in response to said retrieval request with said primary key is said remote one.

19. A parallel database processing system according to claim 17, wherein said second key indexes represent correspondence between the values of said secondary keys for all records and the values of said primary keys as said access information to said records corresponding to said secondary keys, said access means of each of said plurality of local database processing means further include a copy of said primary key partition table for, in response to said converted retrieval request with said primary key, identifying one of said plurality of local database processing means having a record corresponding to said primary key, said access means of each of said plurality of local database processing means, in response to said converted retrieval request with said primary key, identifying one of said plurality of local database processing means having a record corresponding to said primary key with reference to its own copy of said primary key partition table and transferring said converted retrieval request with said primary key of said transferred retrieval request to said identified one of said plurality of local database processing means, and said access means of said identified one of said plurality of local database processing means, in response to said transferred retrieval request with said primary key, obtaining a storage location of a record corresponding to said primary key of said transferred retrieval request with reference to its own main key indexes and accessing its own local table based on said obtained storage location to obtain a target record.

20. A parallel database processing system having global database processing means, a plurality of local database processing means, and a network interconnecting said global database processing means and a plurality of said local database processing means, one table containing a number of records being partitioned into local tables on the basis of values of primary keys, each of said local tables being provided in each said local database processing means, said global database processing means including a primary key partition table responsive to a retrieval request with one of said primary keys for identifying one of said plurality of local database processing means having said local table corresponding to said one of said primary keys, primary key indexes representing correspondence between the values of said primary keys for all records in said one table and storage locations of all records in said local tables being partitioned on the basis of said primary keys into local primary key indexes each set of local primary key indexes being provided in a corresponding one of said plurality of local database processing means having a corresponding one of said local tables, so that said retrieval request with said primary key received by said global database processing means is transferred to a corresponding one of said plurality of local database processing means with reference to said primary key partition table and said corresponding one of said plurality of local database processing means converts the transferred retrieval request with said primary key into a storage location corresponding to said transferred retrieval request with reference to its own set of local primary key indexes to access its own local table based on said storage location thus converted to obtain a record corresponding to said retrieval request with said primary keys, wherein said global database processing means includes:

secondary key indexes indicating correspondence between the values of secondary keys of all records of said one table and said primary keys;

identifying means for identifying said local database processing means corresponding to said primary key;

means for converting said received retrieval request with said secondary key into a retrieval request with said primary key while referring to said secondary key indexes;

means responsive to said converted retrieval request with said primary key for identifying said local database processing means corresponding to said primary key by using said identifying means; and means for transferring said retrieval request to said identified local database processing means, and wherein each of said local database processing means includes:

primary key indexes indicating correspondence between the values of said primary keys and the locations of said records stored in said local table; and access means for accessing said local table corresponding to said retrieval request with said primary key while referring to said primary key indexes.

* * * * *